United States Patent
Hu et al.

(10) Patent No.: US 11,778,455 B2
(45) Date of Patent: Oct. 3, 2023

(54) SUBSCRIBER IDENTITY MANAGEMENT METHOD, DEVICE, AND SYSTEM

(71) Applicant: HUAWEI TECHNOLOGIES CO., LTD., Shenzhen (CN)

(72) Inventors: Weihua Hu, Shanghai (CN); Yanping Zhang, Shanghai (CN); Jianan Hong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/678,256

(22) Filed: Feb. 23, 2022

(65) Prior Publication Data
US 2022/0191685 A1     Jun. 16, 2022

Related U.S. Application Data

(63) Continuation of application No. PCT/CN2020/112530, filed on Aug. 31, 2020.

(30) Foreign Application Priority Data

Aug. 30, 2019    (CN) .......................... 201910817960.X

(51) Int. Cl.
*H04W 8/26* (2009.01)
*H04W 8/06* (2009.01)
*H04W 40/20* (2009.01)

(52) U.S. Cl.
CPC ............... *H04W 8/26* (2013.01); *H04W 8/06* (2013.01); *H04W 40/20* (2013.01)

(58) Field of Classification Search
CPC ......... H04W 8/26; H04W 8/06; H04W 40/20; H04W 8/20; H04W 12/069; H04W 12/72;
(Continued)

(56) References Cited

U.S. PATENT DOCUMENTS 10,194,320 B1    1/2019 Egner et al.
10,299,128 B1 *  5/2019 Suthar ............... H04M 15/66
(Continued)

FOREIGN PATENT DOCUMENTS

CN    101646165 A    2/2010
CN    101982990 A    3/2011
(Continued)

OTHER PUBLICATIONS

Raza et al., "Rethinking LTE Network Functions Virtualization", 2017 IEEE, 10 pages.
(Continued)

*Primary Examiner* — Mazda Sabouri
(74) *Attorney, Agent, or Firm* — Maier & Maier, PLLC

(57) ABSTRACT

A subscriber identity management method, a device, and a system. The method includes: a network device that receives a first message from a terminal device, where the first message includes a first subscriber identity number of the terminal device; the network device sends a second message to a blockchain handling function network element, where the second message includes the first subscriber identity number of the terminal device and is used to query routing information of subscriber data associated with the first subscriber identity number; and the network device receives, from the blockchain handling function network element, the routing information of the subscriber data associated with the first subscriber identity number, where the routing information is used to address the subscriber data associated with the first subscriber identity number.

14 Claims, 11 Drawing Sheets

(58) Field of Classification Search
CPC ..... H04W 12/08; H04W 8/28; H04W 12/108; H04W 12/06; H04W 36/0011; H04W 36/14; H04W 56/001; H04L 9/3247; H04L 63/0823; H04L 9/50

See application file for complete search history.

(56) References Cited

U.S. PATENT DOCUMENTS

| | | | |
|---|---|---|---|
| 10,491,376 B1 * | 11/2019 | Suthar | H04L 63/102 |
| 2007/0218871 A1 | 9/2007 | Bonner | |
| 2019/0090286 A1 | 3/2019 | Vandikas et al. | |
| 2019/0191293 A1 | 6/2019 | Nelson et al. | |
| 2019/0379664 A1 * | 12/2019 | Suthar | H04W 4/70 |
| 2020/0177604 A1 * | 6/2020 | Wei | H04L 9/3234 |
| 2020/0314648 A1 * | 10/2020 | Cao | H04L 9/0643 |
| 2021/0037013 A1 * | 2/2021 | Salkintzis | H04L 65/1069 |
| 2021/0288813 A1 * | 9/2021 | Imbimbo | H04W 12/80 |

FOREIGN PATENT DOCUMENTS

| | | |
|---|---|---|
| CN | 102348200 A | 2/2012 |
| CN | 103078826 A | 5/2013 |
| CN | 107426170 A | 12/2017 |
| CN | 109451451 A | 3/2019 |
| CN | 109462825 A | 3/2019 |
| CN | 109548021 A | 3/2019 |
| CN | 109548180 A | 3/2019 |
| CN | 109587172 A | 4/2019 |
| CN | 109600389 A | 4/2019 |
| CN | 109640274 A | 4/2019 |
| EP | 3477890 A1 | 5/2019 |
| EP | 3525389 A1 | 8/2019 |
| WO | 2019086127 A1 | 5/2019 |

OTHER PUBLICATIONS

Huawei et al., "TS 23.502: Update SMS over NAS procedures", SA WG2 Meeting #120, S2-172741, Mar. 27-31, 2017, Busan, 2 pages.

3GPP TS 23.501 V16.1.0, "3rd Generation Partnership Project; Technical Specification Group Services and System Aspects; System Architecture for the 5G System; Stage 2 (Release 16)", Jun. 2019, 368 pages.

3GPP TS 23.502 V16.1.1, "3rd Generation Partnership Project; Technical Specification Group Services and System Aspects; Procedures for the 5G System; Stage 2 (Release 16)", Jun. 2019, 495 pages.

* cited by examiner

SUBSCRIBER IDENTITY MANAGEMENT METHOD, DEVICE, AND SYSTEM

CROSS-REFERENCE TO RELATED APPLICATIONS

This application is a continuation of International Application No. PCT/CN2020/112530, filed on Aug. 31, 2020, which claims priority to Chinese Patent Application No. 201910817960.X, filed on Aug. 30, 2019. The disclosures of the aforementioned applications are hereby incorporated by reference in their entireties.

FIELD

The embodiments relate to the field of communication technologies, and in particular, to a subscriber identity management method, a device, and a system.

BACKGROUND

In an existing mobile communication network, an operator usually invests in building of a network by itself and applies to a relevant national telecommunication administration department for subscriber identity numbers used to identify identities of mobile terminal subscribers. As a key asset of the operator, such subscriber identity numbers are independently owned and are not shared. After a mobile terminal subscriber subscribes to an operator, the operator assigns a unique subscriber identity number to the mobile terminal subscriber. Further, a network may statically configure a signaling route based on the subscriber identity number. In this way, in a mobile communication service procedure, a network device may perform addressing based on the subscriber identity number. For example, the network device finds, based on the subscriber identity number, a database in which a home network of a subscriber stores subscriber data, and further obtains subscription data of the subscriber from the database. Alternatively, for example, when there is a voice call or an SMS service, the network device needs to find, based on a subscriber identity number of a called subscriber, a database in which a home network of the called subscriber stores subscriber data; and further finds, by using address information that is of a network device currently serving the subscriber and that is stored in the database or a roaming number of the called subscriber that is stored in the database, a network in which the subscriber is currently located. Further, the network device may send an SMS message to a terminal device of the called subscriber or notify the called subscriber to answer the call.

However, enterprises in some vertical industries may build dedicated industry networks through crowdfunding in the future. For example, many automobile enterprises cannot afford to build a nationwide internet of vehicles independently. The enterprises can achieve full-journey full-network coverage in a consortium mode to improve internet of vehicles service quality. The consortium mode can effectively reduce network construction costs and operation and maintenance costs, expand a service scope, and improve service quality. Resources shared by enterprises and operators participating in a consortium include spectrum licenses, subscriber identity numbers, transmission, equipment room sites, data center infrastructure resources, telecommunication network element devices, and the like. That is, in this scenario, subscriber identities are shared among crowdfunding participants as a shared resource and are dynamically used on demand. All members afford costs of obtaining the subscriber identity number resource together. If a subscriber developed by a member uses a subscriber identity number in the subscriber identity number resource, the member affords corresponding costs. Therefore, an ownership relationship between a subscriber identity number and a participant may change frequently. Obviously, in an existing exclusive manner of a subscriber identity number, a technology for a signaling route statically configured based on a subscriber identity number cannot support sharing management and signaling routing of a subscriber identity number in such a scenario.

SUMMARY

Embodiments provide a subscriber identity management method, a device, and a system to implement sharing management and signaling routing of a subscriber identity number in a scenario in which dedicated industry networks are built through crowdfunding in some vertical industries in the future.

To achieve the foregoing objectives, the following solutions are used in the embodiments.

According to a first aspect, a subscriber identity management method is provided. The method includes: A network device receives a first message from a terminal device, where the first message includes a first subscriber identity number of the terminal device; the network device sends a second message to a blockchain handling function network element, where the second message includes the first subscriber identity number of the terminal device and is used to query routing information of subscriber data associated with the first subscriber identity number; and the network device receives, from the blockchain handling function network element, the routing information of the subscriber data associated with the first subscriber identity number, where the routing information is used to address the subscriber data associated with the first subscriber identity number.

In this solution, after obtaining the first subscriber identity number, the network device may obtain the routing information of the subscriber data associated with the first subscriber identity number by querying a consortium blockchain system by using the blockchain handling function network element. In other words, in this embodiment, routing information of subscriber data associated with a subscriber identity number may be recorded by using the consortium blockchain system. This manner replaces a manner in which a conventional telecommunication network relies on an independent signaling network to provide a signaling route. In consideration that in the consortium blockchain system provided in this, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The network device may be a mobility management network element, and the method further includes: the network device sends a third message to a first data management network element based on the routing information of the subscriber data associated with the first subscriber identity number, where the third message includes the first subscriber identity number and is used to request subscription data of the terminal device, and the first data management network element is located in a home network of the terminal device; and the network device receives, from the first data management network element, the subscription data of the terminal device or a cause value of a failure of obtaining the subscription data. That is, in this embodiment, the network device may implement data routing based on the routing information of the subscriber data associated with the first subscriber identity number, for example, obtain the subscription data of the terminal device.

The first message may further include a token for authorizing the mobility management network element to access the subscriber data associated with the first subscriber identity number; and correspondingly, the third message further includes the token, and the token is used to verify legality of accessing the subscriber data of the terminal device by the mobility management network element. Based on this solution, a problem of leakage of the subscription data of the terminal device caused by an unauthorized access procedure can be avoided, and network security is ensured.

The first message may further include a token for authorizing the mobility management network element to access the subscriber data associated with the first subscriber identity number; and correspondingly, the second message further includes the token, and the token is used to verify legality of accessing the subscriber data of the terminal device by the mobility management network element. If the blockchain handling function network element verifies, based on the token, that accessing the subscriber data of the terminal device by the mobility management network element is illegal, the mobility management network element may be refused to access the subscriber data of the terminal device. In other words, an unauthorized access procedure can be ended more quickly by using the token.

Before the network device sends a second message to a blockchain handling function network element, the method may further include: the network device sends a fourth message to a second data management network element, where the fourth message includes the first subscriber identity number of the terminal device and is used to request the subscription data of the terminal device, and the second data management network element is located in a network in which the network device is located; and the network device receives, from the second data management network element, an indication of a failure of obtaining the subscription data. In other words, in this embodiment, if the subscriber identity number shared in the consortium blockchain system is fragmented, the mobility management network element may not necessarily identify, by using the subscriber identity number, whether a subscriber of the terminal device is a roaming subscriber or a local subscriber. In addition, there are some time and performance overheads for an interaction between the blockchain handling function network element and the consortium blockchain system. Therefore, the mobility management network element may first query the second data management network element in a network in which the mobility management network element is located, so as to request to obtain the subscription data of the terminal device.

The network device may be a call session control network element, and the method further includes: the network device sends a fifth message to a first data management network element based on the routing information of the subscriber data associated with the first subscriber identity number, where the fifth message includes the first subscriber identity number and is used to request a roaming number of a called subscriber or routing addressing information of a network in which the called subscriber is currently located, and the first data management network element is located in a home network of the terminal device; the network device receives, from the first data management network element, the roaming number of the called subscriber or the routing addressing information of the network in which the called subscriber is currently located; and the network device continues a voice call procedure or an SMS message procedure based on the roaming number of the called subscriber or the routing addressing information of the network in which the called subscriber is currently located. In other words, in this embodiment, the network device may implement data routing based on the routing information of the subscriber data associated with the first subscriber identity number, for example, obtain the roaming number of the called subscriber or the routing addressing information of the network in which the called subscriber is currently located, and further may continue the voice call procedure or the SMS message procedure based on the roaming number of the called subscriber or the routing addressing information of the network in which the called subscriber is currently located.

Before the network device sends a second message to a blockchain handling function network element, the method may further include: the network device determines that the subscriber data associated with the first subscriber identity number fails to be addressed by using a signaling network route; or the network device determines that the subscriber data associated with the first subscriber identity number fails to be addressed by using a dedicated mobile number portability database. In other words, this embodiment can support roaming interworking of conventional telecommunication networks. For example, the subscriber data associated with the first subscriber identity number may be addressed by using the dedicated mobile number portability database or the subscriber data associated with the first subscriber identity number may be addressed by using the conventional signaling network route.

The routing information of the subscriber data associated with the first subscriber identity number may include routing addressing information of a data management network element configured to store the subscriber data associated with the first subscriber identity number, or the routing information of the subscriber data associated with the first subscriber identity number includes the routing addressing information of the data management network element and index information of the subscriber data.

According to a second aspect, a subscriber identity management method is provided. The method includes: a blockchain handling function network element receives a second message from a network device, where the second message carries a first subscriber identity number of a terminal device and is used to query routing information of subscriber data associated with the first subscriber identity number; the blockchain handling function network element queries a consortium blockchain system based on the first subscriber identity number to obtain the routing information of the subscriber data associated with the first subscriber identity number; and the blockchain handling function network element sends, to the network device, the routing information of the subscriber data associated with the first subscriber identity number, where the routing information is used to address the subscriber data associated with the first subscriber identity number. For an effect of the second aspect, refer to the first aspect. Details are not described herein again.

The network device may include a mobility management network element or a call session control network element.

The network device may be the mobility management network element; the second message further includes a token for authorizing the mobility management network element to access the subscriber data associated with the first subscriber identity number; and that the blockchain handling function network element queries a consortium blockchain system based on the first subscriber identity number includes: the blockchain handling function network element queries the consortium blockchain system based on the first subscriber identity number after the blockchain handling function network element verifies, based on the token, that accessing the subscriber data of the terminal device by the mobility management network element is legal. The blockchain handling function network element may verify, based on the token, that accessing the subscriber data of the terminal device by the mobility management network element is illegal, the mobility management network element may be refused to access the subscriber data of the terminal device. In other words, an unauthorized access procedure can be ended more quickly by using the token.

The routing information of the subscriber data associated with the first subscriber identity number may include routing addressing information of a data management network element configured to store the subscriber data associated with the first subscriber identity number, or the routing information of the subscriber data associated with the first subscriber identity number includes the routing addressing information of the data management network element and index information of the subscriber data.

According to a third aspect, a subscriber identity management method is provided. The method is based on a consortium blockchain system, the consortium blockchain system includes a plurality of consortium member nodes, and the method includes: a first consortium member node determines a quantity M of required subscriber identity numbers, where the first consortium member node is any one of the plurality of consortium member nodes; the first consortium member node obtains a first subscriber identity number from the consortium blockchain system based on the quantity M of required subscriber identity numbers, where the first subscriber identity number includes N numbers in a subscriber identity number resource stored in the consortium blockchain system, and N is a positive integer less than or equal to M; and the first consortium member node broadcasts a transaction record to another consortium member node in the consortium blockchain system after performing subscription and registration for the first subscriber identity number, so that the consortium blockchain system stores the transaction record after the another consortium member node verifies that a transaction is legal, where the transaction record includes the first subscriber identity number and routing information of subscriber data associated with the first subscriber identity number.

Based on the subscriber identity management method provided in this embodiment, in consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The transaction record may further include one or more of the following: an address of a smart contract created by the first consortium member node, where when a terminal device served by the first consortium member node uses a service in a roaming network, the smart contract is used to be invoked by the roaming network to perform charging statistics collection and settlement for the service used by the terminal device in the roaming network; or a signature of the first consortium member node, where the signature of the first consortium member node is used to verify that an identity of a submitter of the transaction record is the first consortium member node.

the routing information of the subscriber data associated with the first subscriber identity number may include routing addressing information of a data management network element configured to store the subscriber data associated with the first subscriber identity number, or the routing information of the subscriber data associated with the first subscriber identity number includes the routing addressing information of the data management network element and index information of the subscriber data.

The method may further include: the first consortium member node updates an obtained subscriber identity number resource or a subscriber identity number resource owned by the first consortium member node to the subscriber identity number resource stored in the consortium blockchain system.

According to a fourth aspect, a subscriber identity management method is provided. The method is based on a consortium blockchain system, the consortium blockchain system includes a plurality of consortium member nodes, and the method includes: a first consortium member node obtains a first subscriber identity number, where the first subscriber identity number is one or more numbers that a second consortium member node prepares to transfer to the first consortium member node, the first consortium member node is any one of the plurality of consortium member nodes, and the second consortium member node is one of the plurality of consortium member nodes that is different from the first consortium member node; and the first consortium member node broadcasts a transaction record to another consortium member node in the consortium blockchain system, so that the consortium blockchain system stores the transaction record after the another consortium member node verifies that a transaction is legal, where the transaction record includes the first subscriber identity number and routing information of subscriber data associated with the first subscriber identity number. For an effect of the fourth aspect, refer to the third aspect. Details are not described herein again.

Before the first consortium member node broadcasts a transaction record to another consortium member node in the consortium blockchain system, the method may further include: the first consortium member node verifies, to the consortium blockchain system, that the second consortium member node is a current owner of the first subscriber identity number; and the first consortium member node performs subscription and registration for the first subscriber identity number. Based on this solution, legality of the subscriber identity number transfer can be ensured, and security of subscriber identity number resources shared by consortium members can also be ensured.

The transaction record may further include one or more of the following: an address of a smart contract created by the first consortium member node, where when a terminal device served by the first consortium member node uses a service in a roaming network, the smart contract is used to be invoked by the roaming network to perform charging statistics collection and settlement for the service used by the terminal device in the roaming network; a signature of the first consortium member node, where the signature of the first consortium member node is used to verify that participants of the transaction record include the first consortium member node; or a signature of the second consortium member node, where the signature of the second consortium member node is used to verify that participants of the transaction record include the second consortium member node.

the routing information of the subscriber data associated with the first subscriber identity number may include routing addressing information of a data management network element configured to store the subscriber data associated with the first subscriber identity number, or the routing information of the subscriber data associated with the first subscriber identity number includes the routing addressing information of the data management network element and index information of the subscriber data.

According to a fifth aspect, a communication apparatus is provided to implement the foregoing methods. The communication apparatus may be the network device in the first aspect or an apparatus including the foregoing network device, the communication apparatus may be the blockchain handling function network element in the second aspect or an apparatus including the foregoing blockchain handling function network element, or the communication apparatus may be the first consortium member node in the third aspect or the fourth aspect or an apparatus including the foregoing first consortium member node. The communication apparatus includes a corresponding module, unit, or means for implementing the foregoing method. The module, unit, or means may be implemented by using hardware or software or implemented by using hardware by executing corresponding software. The hardware or the software includes one or more modules or units corresponding to the function.

According to a sixth aspect, a communication apparatus is provided. The apparatus includes a processor and a memory. The memory is configured to store computer instructions. When the processor executes the instructions, the communication apparatus is enabled to perform the method according to any one of the foregoing aspects. The communication apparatus may be the network device in the first aspect or an apparatus including the foregoing network device, the communication apparatus may be the blockchain handling function network element in the second aspect or an apparatus including the foregoing blockchain handling function network element, or the communication apparatus may be the first consortium member node in the third aspect or the fourth aspect or an apparatus including the foregoing first consortium member node.

According to a seventh aspect, a communication apparatus is provided. The apparatus includes a processor. The processor is configured to: after being coupled to a memory and reading instructions in the memory, perform, according to the instructions, the method according to any one of the foregoing aspects. The communication apparatus may be the network device in the first aspect or an apparatus including the foregoing network device, the communication apparatus may be the blockchain handling function network element in the second aspect or an apparatus including the foregoing blockchain handling function network element, or the communication apparatus may be the first consortium member node in the third aspect or the fourth aspect or an apparatus including the foregoing first consortium member node.

According to an eighth aspect, a computer-readable storage medium is provided. The computer-readable storage medium stores instructions, and when the instructions are run on a computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

According to a tenth aspect, a communication apparatus (for example, the communication apparatus may be a chip or a chip system) is provided. The communication apparatus includes a processor, configured to implement a function in any one of the foregoing aspects. The communication apparatus may further include a memory, where the memory is configured to store necessary program instructions and data. When the communication apparatus is the chip system, the communication apparatus may include a chip, or may include a chip and another discrete component.

For effects brought by the fifth aspect to the tenth aspect, refer to effects brought by the first aspect, the second aspect, the third aspect, or the fourth aspect. Details are not described herein again.

According to an eleventh aspect, a communication system is provided. The communication system includes a network device and a blockchain handling function network element. The network device is configured to perform the subscriber identity management method according to the first aspect. The blockchain handling function network element is configured to perform the subscriber identity management method according to the second aspect. For related descriptions, refer to the first aspect and the second aspect. Details are not described herein again.

DETAILED DESCRIPTION OF THE EMBODIMENTS

For ease of understanding of the solutions in the embodiments, related concepts are first briefly described as follows:

First, Blockchain Technology:

The blockchain technology, also referred to as a distributed ledger technology, is an emerging technology in which several computing devices participate in "bookkeeping" (that is, recording transaction data) to maintain one complete distributed database together. Because the blockchain technology has characteristics of decentralization (no central node exists), openness and transparency, participation of each computing device in database recording, and quick data synchronization between the computing devices, the blockchain technology has been widely applied in numerous fields.

Currently, blockchains may be classified into public blockchains and consortium blockchains based on deployment modes. A public blockchain is a blockchain that can be read by any device in the world or a blockchain of a consensus verification procedure in which any device can participate in a transaction. A consortium blockchain means that participants of a specified blockchain form a consortium, and service transaction information between the participants is recorded in the blockchain, limiting a use scale and a use permission. The embodiments relate to the consortium blockchain. This is described herein and is not described again in the following.

Figure 1:
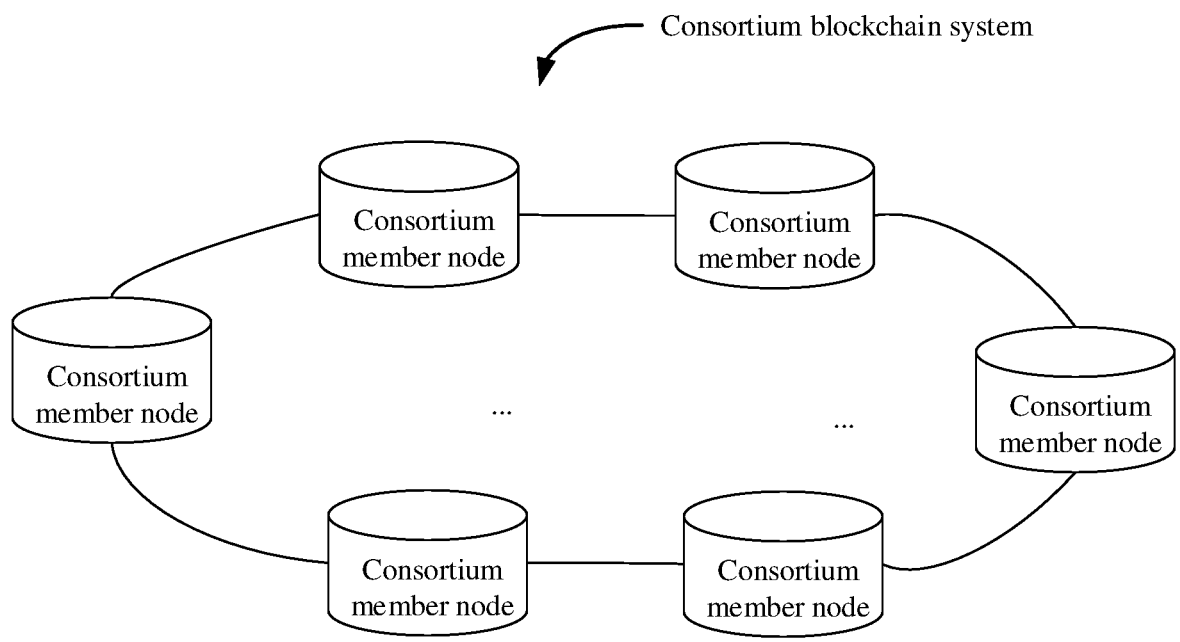
FIG. 1 is a schematic diagram of a structure of a consortium blockchain system according to an embodiment.

Second, Consortium Member Node:

A consortium blockchain in the embodiments may also be referred to as a consortium blockchain system. As shown in FIG. 1, the consortium blockchain system in the embodiments includes a plurality of consortium member nodes. The consortium member node is a device having a communication function and a storage function, for example, a device storing consortium blockchain data. Each consortium member node can receive information and generate information. A common consortium blockchain is maintained between different consortium member nodes to keep communication and data synchronization. For example, in the consortium blockchain system, any consortium member node may generate new consortium blockchain data based on data sent by a client and related to a transaction and notify another consortium member node in a broadcast manner. The another consortium member node may verify the consortium blockchain data. After all consortium member nodes in the consortium blockchain system reach a consensus, the new consortium blockchain data can be added to the consortium blockchain.

Optionally, the consortium member node in the embodiments may be understood as a processing unit. In an implementation, the consortium member node may be a physical device, for example, a server or a computer. In another implementation, the consortium member node may be a virtual computer. A virtual computer is a collective term of running environments virtualized by using software in all types of virtualization devices. The concept of virtual computer includes a virtual machine and a container. In another implementation, the consortium member node in the embodiments may be a process or a thread. The thread is a minimum unit of operation scheduling in an operating system. The thread is included in the process and is an actual operating unit in the process. The process is a running activity of a program in a computer on a data set and is a basic unit for performing resource allocation and scheduling by a system.

Third, Existing Signaling Network Route:

For a mobile network before the fifth generation (5G) network which is currently under discussion, in a registration or location update procedure of a subscriber, a mobility management network element in a visited location (corresponding to a mobility management entity (MME) in the fourth generation (4G) network, and corresponding to a serving general packet radio service (GPRS) support node (SGSN) in the second generation (2G) network or the third generation (3G) network) sends a location update request message to a data management network element in a subscriber home network (corresponding to a home subscriber server (HSS) in the 4G network, and corresponding to a home location register (HLR) in the 2G or 3G network). The location update request message is used to query and match a pre-configured signaling route based on some number segment features in an international mobile subscriber identity (IMSI) number of the subscriber. The data management network element in the subscriber home network is routed and addressed through dedicated signaling network transmission based on a most matched route entry. In this way, a network element in a visited network can obtain subscription information of the subscriber from the data management network element in the subscriber home network. In addition, the data management network element in the subscriber home network registers and stores address information of the mobility management network element that is currently serving the subscriber. For a 5G network, similarly, an access and mobility management function (AMF) network element in a visited location queries local configuration information or invokes a discovery service of a network function repository function (NRF) network element based on a subscriber identity to obtain information about a data management network element (corresponding to a unified data management (UDM) network element in the 5G network) in a subscriber home network, so that the correct data management network element in the subscriber home network can be addressed. When the AMF network element queries the local configuration information or invokes the discovery service of the NRF network element, a pre-configured signaling route is also queried and matched based on some number segment features in the IMSI number. The data management network element in the subscriber home network is routed and addressed through dedicated signaling network transmission based on a most matched route entry.

However, for a subscriber who switches to a network of another operator with the original mobile number, after the subscriber obtains a new subscriber identity module (SIM) card from the operator to which the subscriber switches, the IMSI number also changes accordingly. An operator generally configures dedicated number segments, for example, independent mobile network codes (MNC) or specific fields in IMSI numbers for subscribers that switch from a network of another operator, so as to distinguish between the subscribers, for example, 46007 6 H1H2H3H4 XXXXX, where H is a field in a special format. In addition, a signaling network is configured with corresponding number segment routing data. In this way, a data management network element of a newest home network of a subscriber can be addressed by using all IMSI-based signaling messages. However, a mobile subscriber international ISDN number (MSISDN) of a subscriber is different from the IMSI and cannot be changed after network switching. The signaling network route, however, is a statically configured route that is based on a number segment. It is impossible to configure a route for each subscriber number one by one. Therefore, to avoid an impact of fragmented routes generated by a small quantity of subscribers who switch to a network of another operator on a signaling network number segment route configuration, an extra database is required to separately configure signaling routes of these subscribers who switch to a network of another operator. In this way, a signaling route of a mobile number of a subscriber who does not switch to a network of another operator is not affected, and the signaling of the mobile number of the subscriber is still routed to an original home network based on a statically configured number segment. In addition, for a mobile number of a subscriber who switches to a network of another operator, a database of a new home network of the subscriber can be correctly addressed by querying routing information configured for a separate database. Therefore, to support a mobile number portability feature, the operator needs to upgrade procedures of a large quantity of related network devices and perform special processing on a signaling route of a service procedure of a subscriber who switches to a network of another operator. That is, in the foregoing voice call procedure or SMS message procedure, a subscriber who switches to a network of another operator obtains the data management network element of the subscriber home network by querying the dedicated mobile number portability database.

The following describes the solutions in the embodiments with reference to the accompanying drawings in the embodiments. In descriptions, "/" represents an "or" relationship between associated objects unless otherwise specified. For example, A/B may represent A or B. The term "and/or" is merely an association relationship for describing associated objects and represents that three relationships may exist. For example, A and/or B may represent the following three cases: Only A exists, both A and B exist, and only B exists, where A and B each may be singular or plural. In addition, in the descriptions, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, for ease of clear description of the solutions in the embodiments, terms such as "first", "second", and the like are used in the embodiments to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference. In addition, in the embodiments, words such as "example" or "for example" are used to represent giving an example, an illustration, or a description. Any embodiment described as an "example" or with "for example" in the embodiments should not be explained as being more preferred or having more advantages than another embodiment. Exactly, use of the word such as "example" or "for example" is intended to present a related concept in a specific manner for ease of understanding.

In addition, a network architecture and a service scenario described in the embodiments are intended to describe the solutions in the embodiments more clearly, and do not constitute a limitation on the solutions provided in the embodiments. A person of ordinary skill in the art may be aware that: With the evolution of the network architecture and the emergence of new service scenarios, the solutions provided in the embodiments are also applicable to similar problems.

Figure 2:
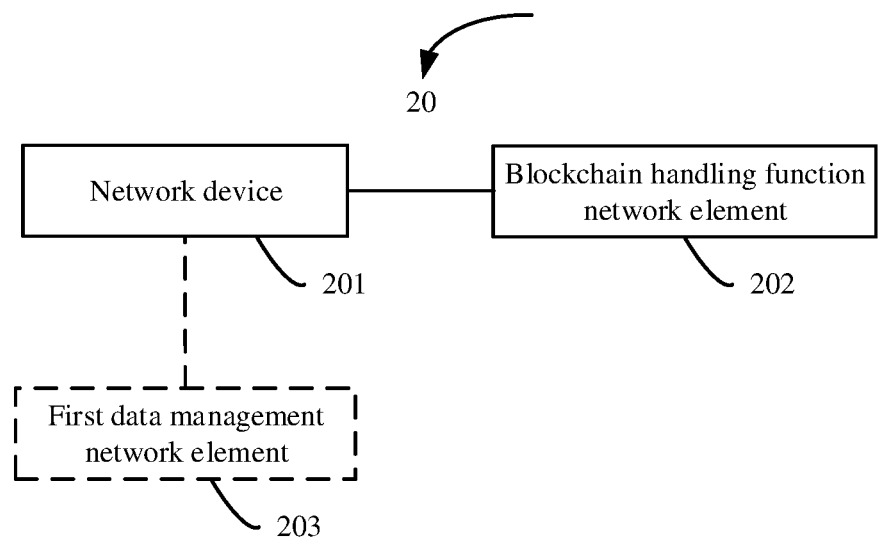
FIG. 2 is a schematic diagram of a structure of a communication system according to an embodiment.

FIG. 2 shows a communication system 20 provided in an embodiment. The communication system 20 includes a network device 201 and a blockchain handling function network element 202. The network device 201 and the blockchain handling function network element 202 may directly communicate with each other or may communicate with each other through forwarding by another device. This is not limited in this embodiment.

The network device 201 is configured to receive a first message from a terminal device, where the first message includes a first subscriber identity number of the terminal device. The network device 201 is further configured to send a second message to the blockchain handling function network element 202, where the second message includes the first subscriber identity number of the terminal device and is used to query routing information of subscriber data associated with the first subscriber identity number. The blockchain handling function network element 202 is configured to: receive the second message from the network device 201 and query a consortium blockchain system based on the first subscriber identity number to obtain the routing information of the subscriber data associated with the first subscriber identity number. The blockchain handling function network element 202 is further configured to send, to the network device 201, the routing information of the subscriber data associated with the first subscriber identity number. The network device 201 is further configured to receive, from the blockchain handling function network element 202, the routing information of the subscriber data associated with the first subscriber identity number, where the routing information is used to address the subscriber data associated with the first subscriber identity number. Specific implementation of the solution is described in detail in subsequent method embodiments. Details are not described herein.

In other words, the blockchain handling function network element in this embodiment may be a consortium member node in the consortium blockchain system, is used as an agent between a network and a consortium blockchain when the network device does not have a consortium blockchain processing function and represents the network to interact with the consortium blockchain. For example, the network device may request the blockchain handling function network element to query routing information of subscriber data associated with a subscriber identity number of a specified subscriber. The blockchain handling function network element may query, based on the subscriber identity number of the specified subscriber, routing information that is of subscriber data associated with the subscriber identity number and that is recorded in the consortium blockchain system, and return the information obtained through query to the network device requesting the query.

In this embodiment, functions of the blockchain handling function network element include but are not limited to: managing a subscriber identity number, verifying an identity of a consortium member node and legality of a transaction, storing or recording a transaction record of a subscriber identity into the consortium blockchain system, settling a transaction fee, executing a smart contract, and the like. The foregoing functions are to be described in detail in subsequent embodiments, and details are not described herein.

In addition, it should be noted that in this embodiment, the subscriber identity number may alternatively be replaced with an identifier indicating a subscriber identity, for example, an internet protocol (IP) address of a terminal device or an identity (ID) of a terminal device. This is described herein and is not described in the following again.

In the communication system provided in this embodiment, after obtaining the first subscriber identity number, the network device may obtain the routing information of the subscriber data associated with the first subscriber identity number by querying the consortium blockchain system by using the blockchain handling function network element. In other words, in this embodiment, routing information of subscriber data associated with a subscriber identity number may be recorded by using the consortium blockchain system. This manner replaces a manner in which a conventional telecommunication network relies on an independent signaling network to provide a signaling route. In consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices, and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

Optionally, as shown in FIG. 2, the communication system 20 may further include a first data management network element 203. The first data management network element 203 is located in a home network of the foregoing terminal device. The first data management network element 203 and the network device 201 may directly communicate with each other or may communicate with each other through forwarding of another device. This is not limited in this embodiment.

In a possible implementation, the network device 201 in this embodiment may be a mobility management network element. Correspondingly, the network device 201 is further configured to send a third message to the first data management network element 203 based on the routing information of the subscriber data associated with the first subscriber identity number, where the third message includes the first subscriber identity number and is used to request subscription data of the terminal device. The first data management network element 203 is configured to: receive the third message; and after querying the subscription data of the terminal device based on the first subscriber identity number, send, to the network device 201, the subscription data of the terminal device or a cause value of a failure of obtaining the subscription data of the terminal device. That is, in this embodiment, the network device may obtain the subscription data of the terminal device based on the routing information of the subscriber data associated with the first subscriber identity number.

In another possible implementation, the network device in this embodiment may be a call session control network element. Correspondingly, the network device 201 is configured to send a fifth message to the first data management network element 203 based on the routing information of the subscriber data associated with the first subscriber identity number, where the fifth message includes the first subscriber identity number and is used to request a mobile roaming number (MRN) of the called subscriber or routing addressing information of a network in which the called subscriber is currently located. The first data management network element 203 is configured to: receive the fifth message; and after querying, based on the first subscriber identity number, the roaming number of the called subscriber or the routing addressing information of the network in which the called subscriber is currently located, send, to the network device 201, the roaming number of the called subscriber or the routing addressing information of the network in which the called subscriber is currently located. The network device 201 is configured to: receive, from the first data management network element 203, the roaming number of the called subscriber or the routing addressing information of the network in which the called subscriber is currently located; and continue a voice call procedure or an SMS message procedure based on the roaming number of the called subscriber or the routing addressing information of the network in which the called subscriber is currently located. In other words, in this embodiment, in the voice call procedure or the SMS message procedure, the network device may obtain, based on the routing information of the subscriber data associated with the first subscriber identity number of the called subscriber, the roaming number of the called subscriber or the routing addressing information of the network in which the called subscriber is currently located; and continue the voice call procedure or the SMS message procedure based on the roaming number of the called subscriber or the routing addressing information of the network in which the called subscriber is currently located.

Optionally, the communication system 20 shown in FIG. 2 may be applied to an existing 2G network, 3G network, and 4G network, a 5G network that is currently under discussion, a future mobile network, or the like. This is not limited in this embodiment.

For example, it is assumed that the communication system 20 shown in FIG. 2 is applied to the 5G network that is currently under discussion. In this case, as shown in FIG. 3, a network element or an entity corresponding to the foregoing mobility management network element may be an AMF network element in the 5G network, a network element or an entity corresponding to the foregoing first data management network element may be a UDM network element in a home network in which a terminal device in the 5G network is located, a network element or an entity corresponding to the foregoing blockchain handling function network element may be a blockchain handling function (BCHF) network element newly added to the 5G network, and a network element or an entity corresponding to the foregoing call session control network element may be a proxy call session control function (P-CSCF) network element or a gateway mobile switching center (MSC) for short message service (gateway MSC for short message service, SMS-GMSC) network element in the 5G network.

Figure 3:
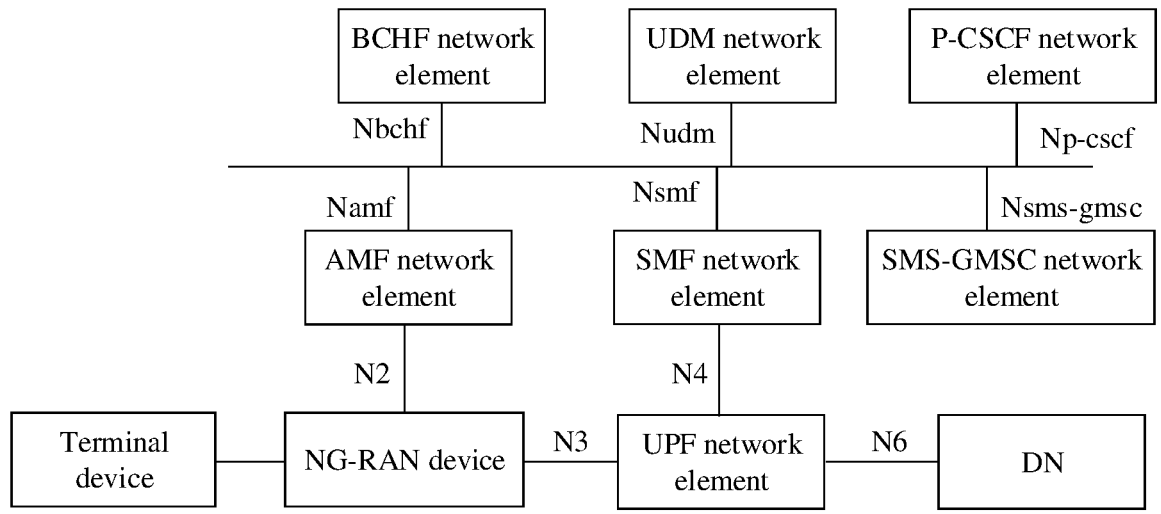
FIG. 3 is a schematic architectural diagram of a system of a 5G network according to an embodiment.

In addition, as shown in FIG. 3, the 5G network may alternatively include other network elements such as a next generation radio access network (NG-RAN) device, a session management function (SMF) network element, and a user plane function (UPF) network element. This is not limited in this embodiment.

As shown in FIG. 3, the terminal device accesses the 5G network through the NG-RAN device, the NG-RAN device communicates with the UPF network element through a next generation N3 interface, and the UPF network element communicates with a data network (DN) through an N6 interface. In addition, the NG-RAN device communicates with the AMF network element through an N2 interface, and the UPF network element communicates with the SMF network element through an N4 interface. A control plane network element such as the AMF network element, the SMF network element, the UDM network element, the P-CSCF network element, the SMS-GMSC network element, or the BCHF network element interacts through a service-oriented interface. For example, an external service-based interface provided by the AMF network element may be an Namf interface, an external service-based interface provided by the SMF network element may be an Nsmf interface, and an external service-based interface provided by the UDM network element may be an Nudm interface. For related descriptions, refer to a diagram of a 5G system architecture in the 23501 standard. Details are not described herein. In addition, a service-oriented interface provided by the BCHF network element for outside may be Nbchf, which is a newly added interface and provides, for a 5G network element, a service of querying routing information of subscriber data associated with a subscriber identity number. A service-oriented interface provided by the P-CSCF network element for outside may be Np-cscf. A service-oriented interface provided by the SMS-GMSC network element for outside may be Nsms-gmsc. The two interfaces are both newly added interfaces. In this embodiment, the P-CSCF network element or the SMS-GMSC network element may alternatively not provide an interface-oriented service. Instead, the P-CSCF network element or the SMS-GMSC network element is connected to the BCHF network element. This is not limited in this embodiment.

For example, it is assumed that the communication system 20 shown in FIG. 2 is applied to an existing 4G network. In this case, as shown in FIG. 4, a network element or an entity corresponding to the foregoing mobility management network element may be an MME in the 4G network, a network element or an entity corresponding to the foregoing first data management network element may be an HSS in the 4G network, a network element or an entity corresponding to the foregoing blockchain handling function network element may be a newly added BCHF network element in the 4G network, and a network element or an entity corresponding to the foregoing call session control network element may be a P-CSCF network element or an SMS-GMSC network element in the 4G network.

Figure 4:
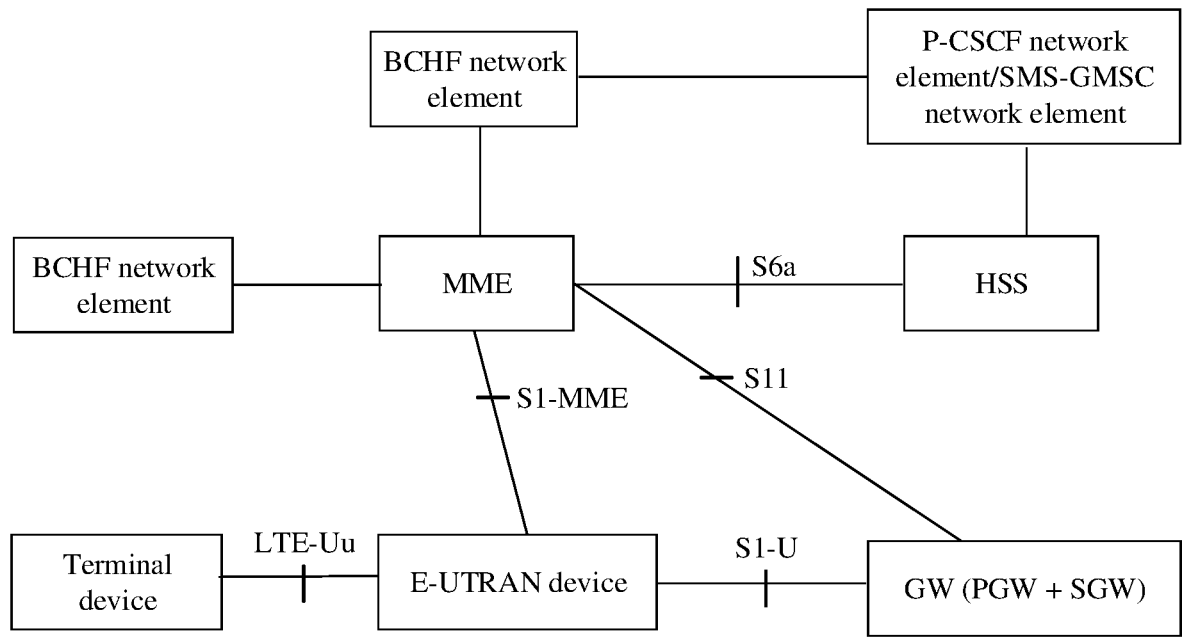
FIG. 4 is a schematic architectural diagram of a system of a 4G network according to an embodiment.

In addition, as shown in FIG. 4, the 4G network may further include other network elements such as an evolved universal mobile telecommunications system (UMTS) territorial radio access network (E-UTRAN) device and a gateway (GW). This is not limited in this embodiment.

As shown in FIG. 4, a terminal device accesses the 4G network through the E-UTRAN device, the E-UTRAN device communicates with the GW through an S1-U interface, the E-UTRAN device communicates with the MME through an S1-MME interface, the MME communicates with the GW through an S11 interface, the HSS communicates with the MME through an S6a interface, and the P-CSCF network element or the SMS-GMSC network element communicates with the HSS. For related descriptions, refer to an existing 4G system architectural diagram. Details are not described herein. In addition, the newly added BCHF network element may communicate with the MME and the P-CSCF network element or the SMS-GMSC network element.

For example, it is assumed that the communication system 20 shown in FIG. 2 is applied to an existing 2G or 3G network. In this case, as shown in FIG. 5, a network element or an entity corresponding to the foregoing mobility management network element may be an SGSN in the 2G or 3G network, a network element or an entity corresponding to the foregoing first data management network element may be an HLR in the 2G or 3G network, a network element or an entity corresponding to the foregoing blockchain handling function network element may be a newly added BCHF network element in the 2G or 3G network, and a network element or an entity corresponding to the foregoing call session control network element may be a mobile switching center (MSC) network element or an SMS-GMSC network element in the 2G or 3G network.

Figure 5:
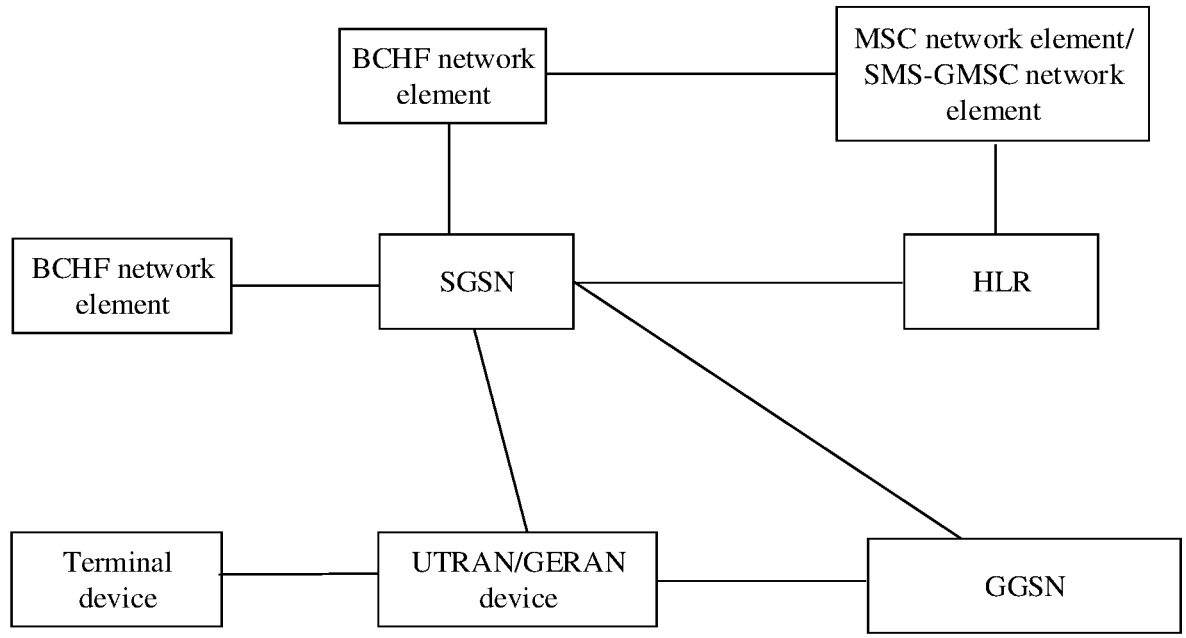
FIG. 5 is a schematic architectural diagram of a system of a 2G or 3G network according to an embodiment.

In addition, as shown in FIG. 5, the 2G or 3G network may further include another network element such as a UTRAN device/a global system for mobile communications (GSM), an enhanced data rate for GSM evolution (EDGE) radio access network (GERAN) device, or a gateway GPRS support node (GGSN). For a connection manner of the network elements, refer to an existing 2G or 3G network system architectural diagram. Details are not described herein. In addition, the newly added BCHF network element may communicate with the SGSN and the MSC network element or the SMS-GMSC network element.

It should be noted that, in this embodiment, the BCHF network element newly added to the mobile network may be an independent function module and is independently deployed of a network element in a mobile network or may be a distributed function module and is deployed with a network element in a mobile network together. This is not limited in this embodiment.

It should be noted that in this embodiment, the foregoing SMS-GMSC network element may be replaced with a short message service center (SMSC). This is described herein and is not described in the following again.

Optionally, the network device 201, the blockchain handling function network element 202, or the first data management network element 203 in this embodiment may also be referred to as a communication apparatus and may be a general-purpose device or a dedicated device. This is not limited in this embodiment.

Optionally, a related function of the network device 201, the blockchain handling function network element 202, or the first data management network element 203 in this embodiment may be implemented by one device, may be implemented by a plurality of devices together, or may be implemented by one or more function modules in one device. This is not limited in this embodiment. It may be understood that the foregoing function may be a network element on a hardware device, a software function running on dedicated hardware, a combination of hardware and software, or may be a virtualization function instantiated on a platform (for example, a cloud platform).

Figure 6:
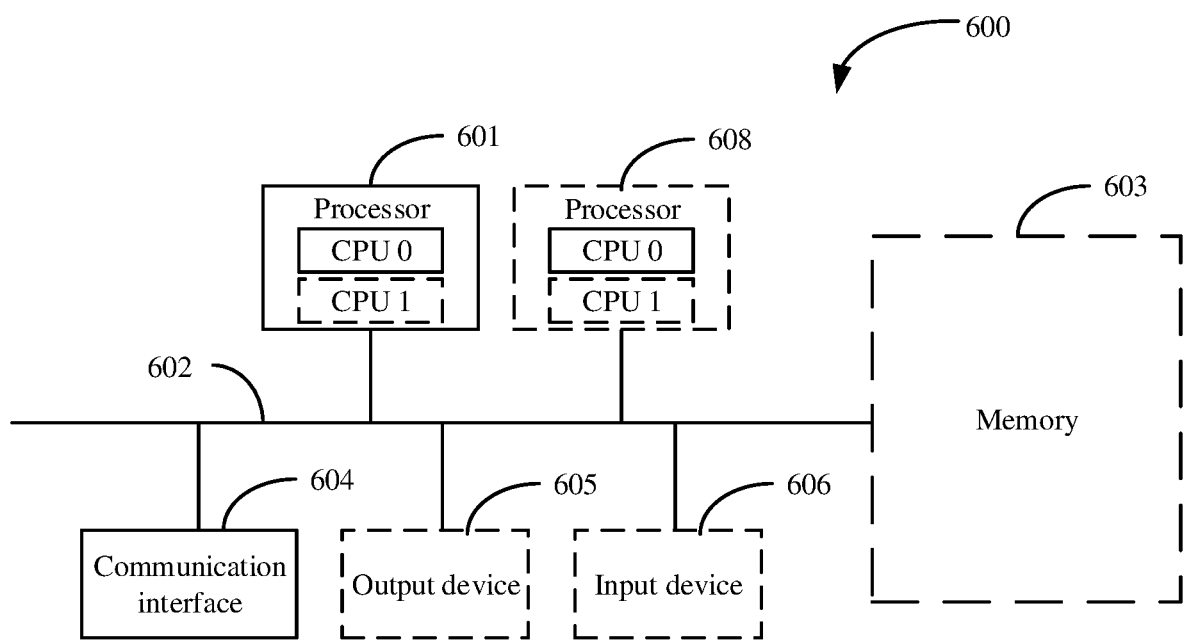
FIG. 6 is a schematic diagram of a structure of a communication device according to an embodiment.

For example, a related function of the network device 201, the blockchain handling function network element 202, or the first data management network element 203 in this embodiment may be implemented by using a communication device 600 in FIG. 6. FIG. 6 is a schematic diagram of a structure of the communication device 600 according to an embodiment. The communication device 600 includes one or more processors 601, a communication line 602, and at least one communication interface (in FIG. 6, that the communication device 600 includes a communication interface 604 and one processor 601 is merely an example for description). Optionally, the communication device 600 may further include a memory 603.

The processor 601 may be a general-purpose central processing unit (CPU), a microprocessor, an application-specific integrated circuit (ASIC), or one or more integrated circuits configured to control program execution of the solutions.

The communication line 602 may include a channel, configured to connect different components.

The communication interface 604 may be a transceiver module configured to communicate with another device or a communication network such as the Ethernet, a RAN, or a wireless local area network (WLAN). For example, the transceiver module may be an apparatus, for example, a transceiver or a transceiver machine. Optionally, the communication interface 604 may alternatively be a transceiver circuit located inside the processor 601, configured to input a signal into the processor and output a signal from the processor.

The memory 603 may be an apparatus having a storage function. For example, the memory 603 may be a read-only memory (ROM) or another type of static storage device that can store static information and instructions; or a random access memory (RAM) or another type of dynamic storage device that can store information and instructions; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium, another magnetic storage device, or any other medium that can be configured to carry or store expected program code in a form of an instruction or a data structure and that is accessible by a computer, but is not limited thereto. The memory may exist independently and is connected to the processor through the communication line 602. Alternatively, the memory may be integrated with the processor.

The memory 603 is configured to store computer-executable instructions for performing the solutions, and execution of the computer-executable instructions is controlled by the processor 601. The processor 601 is configured to execute the computer-executable instructions stored in the memory 603 to implement the subscriber identity management method provided in the embodiments.

Alternatively, optionally, in this embodiment, the processor 601 may perform functions related to processing in the subscriber identity management method provided in the following embodiments. The communication interface 604 is responsible for communicating with another device or a communication network. This is not limited in this embodiment.

Optionally, the compute-executable instructions in the embodiments may also be referred to as application program code. This is not limited in the embodiments.

During implementation, in an embodiment, the processor 601 may include one or more CPUs, for example, a CPU 0 and a CPU 1 in FIG. 6.

During implementation, in an embodiment, the communication device 600 may include a plurality of processors, for example, a processor 601 and a processor 608 in FIG. 6. Each of the processors may be a single-core processor or may be a multi-core processor. The processor herein may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing a software instruction.

During implementation, in an embodiment, the communication device 600 may further include an output device 605 and an input device 606. The output device 605 communicates with the processor 601 and may display information in a plurality of manners. For example, the output device 605 may be a liquid crystal display (LCD), a light emitting diode (LED) display device, a cathode ray tube (CRT) display device, or a projector. The input device 606 communicates with the processor 601 and may receive an input of a subscriber in a plurality of manners. For example, the input device 606 may be a mouse, a keyboard, a touchscreen device, or a sensing device.

The communication device 600 sometimes may also be referred to as a communication apparatus and may be a general-purpose device or a dedicated device. For example, the communication device 600 may be a desktop computer, a portable computer, a network server, a palmtop computer, a personal digital assistant (PDA), a mobile phone, a tablet computer, a wireless terminal device, an embedded device, the foregoing terminal device, the foregoing network device, or a device having a structure similar to the structure shown in FIG. 6. A type of the communication device 600 is not limited in this embodiment.

With reference to FIG. 1 to FIG. 6, the following describes in detail the subscriber identity management method provided in the embodiments.

It should be noted that names of messages or parameters in messages between network elements in the following embodiments are merely examples, and the messages or the parameters may have other names during implementation. This is not limited in the embodiments.

First, for example, the communication system shown in FIG. 2 is applied to the 5G network architecture shown in FIG. 3, and the network device is an AMF network element.

Figure 7:
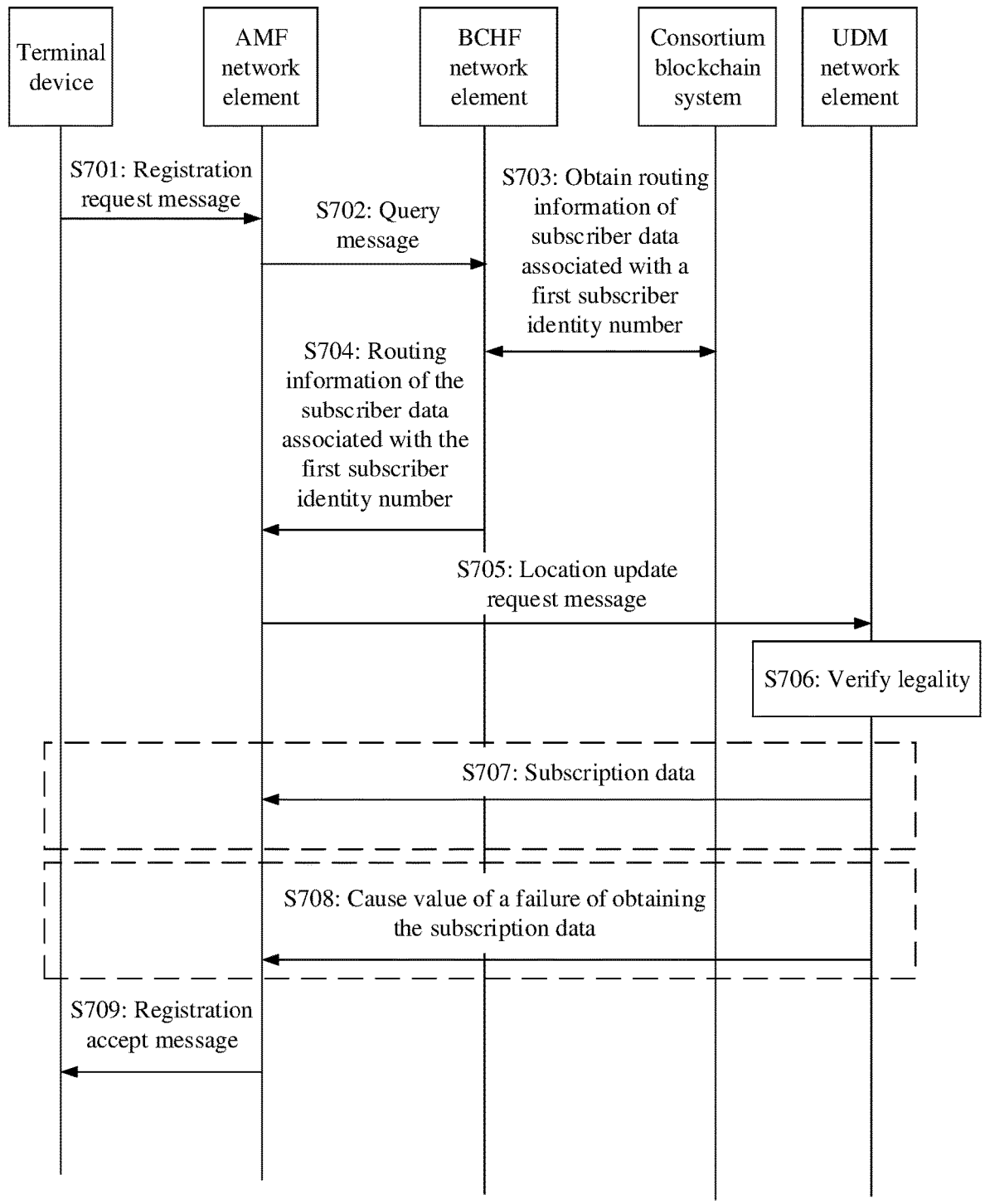
FIG. 7 is a first schematic flowchart of a subscriber identity management method according to an embodiment.

FIG. 7 shows a subscriber identity management method according to an embodiment. The subscriber identity management method includes the following steps:

S701: A terminal device sends a registration request message to an AMF network element in a network in which the terminal device is currently located. Correspondingly, the AMF network element receives the registration request message from the terminal device. The registration request message includes a first subscriber identity number of the terminal device.

For example, in this embodiment, the first subscriber identity number of the terminal device may be an IMSI of the terminal device.

Optionally, in this embodiment, the registration request message may further include: a tracking area identity, a token for authorizing the AMF network element to access subscriber data associated with the first subscriber identity number, or the like. This is not limited herein.

It should be noted that the registration request message in this embodiment is an example description of the first message in the foregoing embodiment. The first message may alternatively be in another form. This is not limited in this embodiment.

S702: The AMF network element sends a query message to a BCHF network element. Correspondingly, the BCHF network element receives the query message from the AMF network element. The query message includes the first subscriber identity number of the terminal device and is used to query routing information of the subscriber data associated with the first subscriber identity number.

Optionally, in this embodiment, the routing information of the subscriber data associated with the first subscriber identity number may include routing addressing information of a UDM network element configured to store the subscriber data associated with the first subscriber identity number, or the routing information of the subscriber data associated with the first subscriber identity number may include routing addressing information of a UDM network element configured to store the subscriber data associated with the first subscriber identity number and index information of the subscriber data associated with the first subscriber identity number. For example, the routing addressing information of the UDM network element may be an IP address of the UDM network element or a device identifier of the UDM network element. This is not limited in this embodiment.

Optionally, in this embodiment, if an NRF network element is deployed in the network, the AMF network element may invoke a service provided by the NRF network element, and the NRF network element sends the query message to the BCHF network element. This is not limited in this embodiment.

Optionally, in this embodiment, the query message may further include a token for authorizing the AMF network element to access the subscriber data associated with the first subscriber identity number. This is not limited herein.

It should be noted that the query message in this embodiment is an example description of the second message in the foregoing embodiment. The second message may alternatively be in another form. This is not limited in this embodiment.

S703: The BCHF network element queries a consortium blockchain system based on the first subscriber identity number to obtain the routing information of the subscriber data associated with the first subscriber identity number.

As described above, the BCHF network element in this embodiment may be considered as a consortium member node in the consortium blockchain system. Therefore, optionally, in this embodiment, that the BCHF network element queries a consortium blockchain system based on the first subscriber identity number may include: The BCHF network element queries, based on the first subscriber identity number, consortium blockchain data stored on the BCHF network element in the consortium blockchain system, to obtain the routing information of the subscriber data associated with the first subscriber identity number; or the BCHF network element sends the first subscriber identity number to another consortium member node in the consortium blockchain system, so that the another consortium member node queries, based on the first subscriber identity number, consortium blockchain data stored on the another consortium member node, to obtain the routing information of the subscriber data associated with the first subscriber identity number. This is not limited in this embodiment.

Optionally, in this embodiment, if the query message in step S702 may further include the token for authorizing the AMF network element to access the subscriber data associated with the first subscriber identity number, the BCHF network element may verify, based on the token, legality of accessing the subscriber data of the terminal device by the AMF network element. After it is verified that the access is legal, the BCHF network element queries the consortium blockchain system based on the first subscriber identity number to obtain the routing information of the subscriber data associated with the first subscriber identity number. This is not limited in this embodiment. In this embodiment, if the BCHF network element verifies, based on the token, that accessing the subscriber data of the terminal device by the AMF network element is illegal, the AMF network element may be refused to access the subscriber data of the terminal device. In other words, by adding, to the query message, the token for authorizing the AMF network element to access the subscriber data associated with the first subscriber identity number, an unauthorized access procedure can be ended more quickly. This is described herein and is not described in the following again.

Optionally, in this embodiment, a method in which the BCHF network element verifies, based on the token, the legality of accessing the subscriber data of the terminal device by the AMF network element may include, for example: If the token is a signature generated based on a private key of the terminal device and the BCHF network element verifies, by using a public key of the terminal device, that the signature is from the terminal device, the BCHF network element may determine that the AMF network element has been legally authorized by the terminal device.

S704: The BCHF network element sends, to the AMF network element, the routing information of the subscriber data associated with the first subscriber identity number. Correspondingly, the AMF network element receives, from the BCHF network element, the routing information of the subscriber data associated with the first subscriber identity number.

S705: The AMF network element sends a location update request message to a UDM network element in a home network of the terminal device based on the routing information of the subscriber data associated with the first subscriber identity number. Correspondingly, the UDM network element receives the location update request message from the AMF network element. The location update request message includes the first subscriber identity number and is used to request subscription data of the terminal device.

Optionally, in this embodiment, the location update request message may further include a token for authorizing the AMF network element to access the subscriber data associated with the first subscriber identity number. The token is used to verify the legality of accessing the subscriber data of the terminal device by the AMF network element. This is not limited herein.

It should be noted that the location update request message in this embodiment is an example description of the third message in the foregoing embodiment. The third message may alternatively be in another form. This is not limited in this embodiment.

S706: The UDM network element verifies, based on the first subscriber identity number and the token (where the token is optional) for authorizing the AMF network element to access the subscriber data associated with the first subscriber identity number, whether accessing the subscriber data of the terminal device by the AMF network element is legally authorized.

Optionally, in this embodiment, a method in which the UDM network element verifies, based on the first subscriber identity number and the token (where the token is optional) for authorizing the AMF network element to access the subscriber data associated with the first subscriber identity number, whether accessing the subscriber data of the terminal device by the AMF network element is legally authorized may include: If the token is a signature generated based on a private key of the terminal device and the UDM network element verifies, by using a public key of the terminal device, that the signature is from the terminal device, the UDM network element may determine that the AMF network element has been legally authorized by the terminal device.

S707: If the UDM network element verifies that accessing the subscriber data of the terminal device by the AMF network element has been legally authorized, the UDM network element queries a database of the UDM network element based on the first subscriber identity number (that is, the IMSI of the terminal device) to obtain the subscription data of the terminal device, and further sends the subscription data of the terminal device to the AMF network element. Correspondingly, the AMF network element receives the subscription data of the terminal device from the UDM network element.

Optionally, if the routing information of the subscriber data associated with the first subscriber identity number in this embodiment includes the routing addressing information of the UDM network element storing the subscriber data associated with the first subscriber identity number and the index information of the subscriber data associated with the first subscriber identity number, the UDM network element may find the subscription data of the terminal device quickly with reference to the index information of the subscriber data associated with the first subscriber identity number when querying the database of the UDM network element based on the first subscriber identity number (that is, the IMSI of the terminal device).

It should be noted that in this embodiment, if the location update request message does not include the token for authorizing the AMF network element to access the subscriber data associated with the first subscriber identity number, step S706 does not need to be performed. Instead, the UDM network element directly queries the database of the UDM network element based on the first subscriber identity number (that is, the IMSI of the terminal device) to obtain the subscription data of the terminal device, and further sends the subscription data of the terminal device to the AMF network element. This is described herein and is not described in the following again.

S708: If the UDM network element verifies that accessing the subscriber data of the terminal device by the AMF network element has not been legally authorized, the UDM network element fails to obtain the subscription data of the terminal device; and further, the UDM network element may send, to the AMF network element, a cause value of the failure of obtaining the subscription data. Correspondingly, the AMF network element may receive, from the UDM network element, the cause value of the failure of obtaining the subscription data.

For example, the cause value of the failure of obtaining the subscription data may be that the UDM network element verifies that accessing the subscriber data of the terminal device by the AMF network element has not been legally authorized.

Optionally, in this embodiment, if a subscriber identity number (for example, the IMSI number segment in the embodiments) shared in the consortium blockchain system is fragmented, the AMF network element may not necessarily identify, by using the subscriber identity number, whether a subscriber of the terminal device is a roaming subscriber or a local subscriber. In addition, there are some time and performance overheads for an interaction between the BCHF network element and the consortium blockchain system. Therefore, the AMF network element may first query the UDM network element (which may be a local UDM network element) in the network in which the AMF network element is located, to request to obtain the subscription data of the terminal device; and if the subscription data fails to be obtained, initiate query to the BCHF network element to query the routing information of the subscriber data associated with the first subscriber identity number, and further obtain the subscription data of the terminal device from the UDM network element in the home network of the terminal device based on the routing information of the subscriber data associated with the first subscriber identity number. This is not limited in this embodiment.

S709: The AMF network element sends a registration accept message to the terminal device. Correspondingly, the terminal device receives the registration accept message from the AMF network element. The registration accept message includes a registration result of the terminal device.

The embodiment shown in FIG. 7 provides the subscriber identity management method by using the registration procedure as an example. Based on the subscriber identity management method provided in this embodiment, after obtaining the first subscriber identity number, the AMF network element may obtain the routing information of the subscriber data associated with the first subscriber identity number by querying the consortium blockchain system by using the BCHF network element. In other words, in this embodiment, routing information of subscriber data associated with a subscriber identity number may be recorded by using the consortium blockchain system. This manner replaces a manner in which a conventional telecommunication network relies on an independent signaling network to provide a signaling route. In consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The actions of the BCHF network element, the UDM network element, or the AMF network element in step S701 to step S709 may be performed by the processor 601 in the communication device 600 shown in FIG. 6 by invoking the application program code stored in the memory 603. This is not limited in this embodiment.

Figure 8:
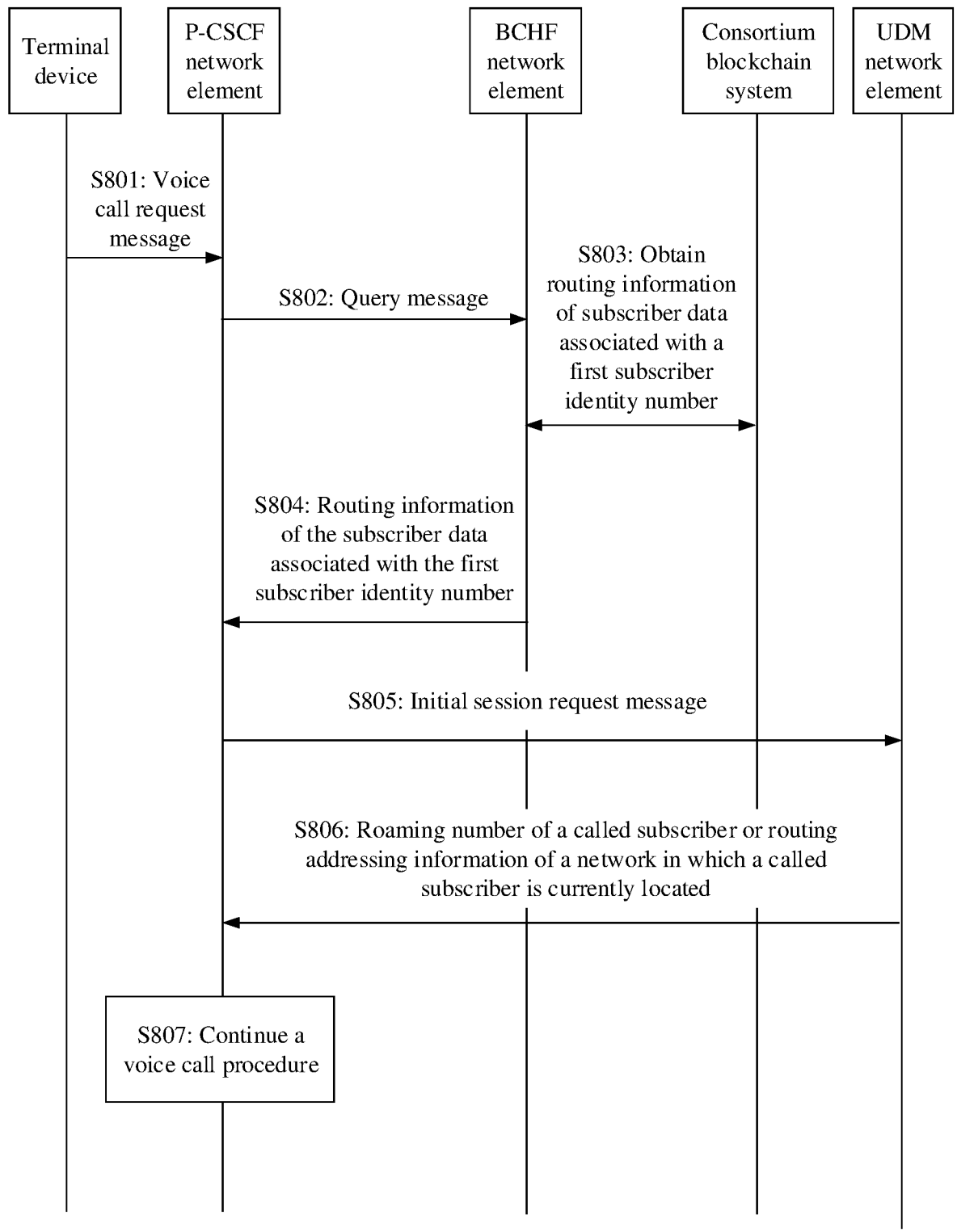
FIG. 8 is a second schematic flowchart of a subscriber identity management method according to an embodiment.

Optionally, for example, the communication system shown in FIG. 2 is applied to the 5G network architecture shown in FIG. 3, and the network device is a P-CSCF network element. FIG. 8 shows a subscriber identity management method according to an embodiment. The subscriber identity management method includes the following steps:

S801: A terminal device of a calling subscriber sends a voice call request message to a P-CSCF network element. Correspondingly, the P-CSCF network element receives the voice call request message from the terminal device of the calling subscriber. The voice call request message includes a first subscriber identity number of a terminal device of a called subscriber.

For example, in this embodiment, the first subscriber identity number of the terminal device of the called subscriber may be an MSISDN number of the terminal device of the called subscriber.

It should be noted that the voice call request message in this embodiment is an example description of the first message in the foregoing embodiment. The first message may alternatively be in another form. This is not limited in this embodiment.

S802: The P-CSCF network element sends a query message to a BCHF network element. Correspondingly, the BCHF network element receives the query message from the P-CSCF network element. The query message includes the first subscriber identity number of the terminal device of the called subscriber and is used to query routing information of subscriber data associated with the first subscriber identity number of the called subscriber.

Optionally, in this embodiment, for a related description of the routing information of the subscriber data associated with the first subscriber identity number of the called subscriber, refer to the routing information of the subscriber data associated with the first subscriber identity number described in the registration procedure in the embodiment shown in FIG. 7. Details are not described herein again.

It should be noted that the query message in this embodiment is an example description of the second message in the foregoing embodiment. The second message may alternatively be in another form. This is not limited in this embodiment.

S803: The BCHF network element queries a consortium blockchain system based on the first subscriber identity number to obtain the routing information of the subscriber data associated with the first subscriber identity number.

As described above, the BCHF network element in this embodiment may be considered as a consortium member node in the consortium blockchain system. Therefore, optionally, in this embodiment, that the BCHF network element queries a consortium blockchain system based on the first subscriber identity number may include: The BCHF network element queries, based on the first subscriber identity number, consortium blockchain data stored on the BCHF network element in the consortium blockchain system, to obtain the routing information of the subscriber data associated with the first subscriber identity number; or the BCHF network element sends the first subscriber identity number to another consortium member node in the consortium blockchain system, so that the another consortium member node queries, based on the first subscriber identity number, consortium blockchain data stored on the another consortium member node, to obtain the routing information of the subscriber data associated with the first subscriber identity number. This is not limited in this embodiment.

S804: The BCHF network element sends, to the P-CSCF network element, the routing information of the subscriber data associated with the first subscriber identity number. Correspondingly, the P-CSCF network element receives, from the BCHF network element, the routing information of the subscriber data associated with the first subscriber identity number.

S805: The P-CSCF network element sends an initial session request message to a UDM network element in a home network of the terminal device of the called subscriber based on the routing information of the subscriber data associated with the first subscriber identity number. Correspondingly, the UDM network element receives the initial session request message from the P-CSCF network element. The initial session request message includes the first subscriber identity number and is used to request a roaming number of the called subscriber or routing addressing information of a network in which the called subscriber is currently located.

It should be noted that the initial session request message in this embodiment is an example description of the fifth message in the foregoing embodiment. The fifth message may alternatively be in another form. This is not limited in this embodiment.

S806: The UDM network element queries a database of the UDM network element based on the first subscriber identity number to obtain the roaming number of the called subscriber or the routing addressing information of the network in which the called subscriber is currently located, and further sends, to the P-CSCF network element, the roaming number of the called subscriber or the routing addressing information of the network in which the called subscriber is currently located. Correspondingly, the P-CSCF network element receives, from the UDM network element, the roaming number of the called subscriber or the routing addressing information of the network in which the called subscriber is currently located.

Optionally, if the routing information of the subscriber data associated with the first subscriber identity number in this embodiment includes the routing addressing information of the UDM network element storing the subscriber data associated with the first subscriber identity number and index information of the subscriber data associated with the first subscriber identity number, the UDM network element may quickly find, with reference to the index information of the subscriber data associated with the first subscriber identity number, the roaming number of the called subscriber or the routing addressing information of the network in which the called subscriber is currently located when querying the database of the UDM network element based on the first subscriber identity number.

S807: The P-CSCF network element continues a voice call procedure based on the roaming number of the called subscriber or the routing addressing information of the network in which the called subscriber is currently located. For example, the voice call request message is sent, based on the roaming number or the routing addressing information, to a next-hop node for processing. This is not limited herein.

It should be noted that in this embodiment, to support roaming interworking of conventional telecommunication networks, before querying, from the BCHF network element, the routing information of the subscriber data associated with the first subscriber identity number of the called subscriber, the P-CSCF network element may alternatively use a manner in an existing technology to address, by using a signaling network route, the subscriber data associated with the first subscriber identity number; or address, by using a dedicated mobile number portability database, the subscriber data associated with the first subscriber identity number. If the P-CSCF network element determines that the subscriber data associated with the first subscriber identity number fails to be addressed by using the signaling network route or the subscriber data associated with the first subscriber identity number fails to be addressed by using the dedicated mobile number portability database, the P-CSCF network element queries, from the BCHF network element, the routing information of the subscriber data associated with the first subscriber identity number of the called subscriber. The P-CSCF network element may alternatively query, from the BCHF network element, the routing information of the subscriber data associated with the first subscriber identity number of the called subscriber; and if the query fails, use the manner in the existing technology to address, by using the signaling network route, the subscriber data associated with the first subscriber identity number; or address, by using the dedicated mobile number portability database, the subscriber data associated with the first subscriber identity number. This is not limited in this embodiment.

The embodiment shown in FIG. 8 provides the subscriber identity management method by using the voice call procedure as an example. Based on the subscriber identity management method provided in this embodiment, after obtaining the first subscriber identity number, the P-CSCF network element may obtain the routing information of the subscriber data associated with the first subscriber identity number by querying the consortium blockchain system by using the BCHF network element. In other words, in this embodiment, routing information of subscriber data associated with a subscriber identity number may be recorded by using the consortium blockchain system. This manner replaces a manner in which a conventional telecommunication network relies on an independent signaling network to provide a signaling route. In consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices, and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The actions of the BCHF network element, the UDM network element, or the P-CSCF network element in step S801 to step S807 may be performed by the processor 601 in the communication device 600 shown in FIG. 6 by invoking the application program code stored in the memory 603. This is not limited in this embodiment.

Figure 9:
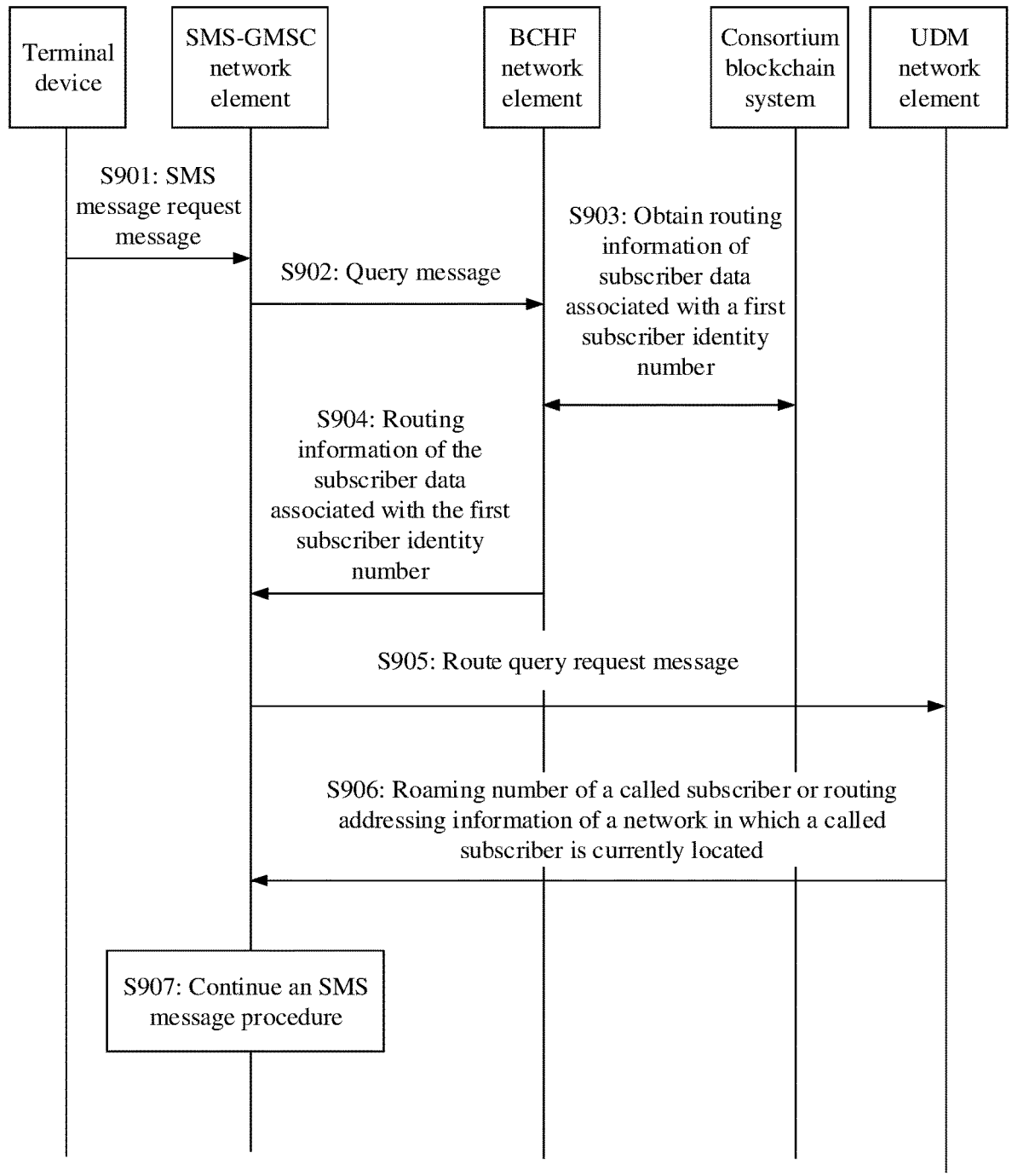
FIG. 9 is a third schematic flowchart of a subscriber identity management method according to an embodiment.

Optionally, for example, the communication system shown in FIG. 2 is applied to the 5G network architecture shown in FIG. 3 and the network device is an SMS-GMSC network element. FIG. 9 shows a subscriber identity management method according to an embodiment. The subscriber identity management method includes the following steps:

S901: A terminal device of a calling subscriber sends an SMS message request message to an SMS-GMSC network element. Correspondingly, the SMS-GMSC network element receives the SMS message request message from the terminal device of the calling subscriber. The SMS message request message includes a first subscriber identity number of a terminal device of a called subscriber.

For example, in this embodiment, the first subscriber identity number of the terminal device of the called subscriber may be an MSISDN number of the terminal device of the called subscriber.

It should be noted that the SMS message request message in this embodiment is an example description of the first message in the foregoing embodiment. The first message may alternatively be in another form. This is not limited in this embodiment.

S902: The SMS-GMSC sends a query message to a BCHF network element. Correspondingly, the BCHF network element receives the query message from the SMS-GMSC network element. The query message includes the first subscriber identity number of the terminal device of the called subscriber and is used to query routing information of subscriber data associated with the first subscriber identity number of the called subscriber.

Optionally, in this embodiment, for a related description of the routing information of the subscriber data associated with the first subscriber identity number of the called subscriber, refer to the routing information of the subscriber data associated with the first subscriber identity number described in the registration procedure in the embodiment shown in FIG. 7. Details are not described herein again.

It should be noted that the query message in this embodiment is an example description of the second message in the foregoing embodiment. The second message may alternatively be in another form. This is not limited in this embodiment.

S903: The BCHF network element queries a consortium blockchain system based on the first subscriber identity number to obtain the routing information of the subscriber data associated with the first subscriber identity number.

For specific implementation of step S903, refer to step S803 in the embodiment shown in FIG. 8. Details are not described herein again.

S904: The BCHF network element sends, to the SMS-GMSC network element, the routing information of the subscriber data associated with the first subscriber identity number. Correspondingly, the SMS-GMSC network element receives, from the BCHF network element, the routing information of the subscriber data associated with the first subscriber identity number.

S905: The SMS-GMSC network element sends a route query request message to a UDM network element in a home network of the terminal device of the called subscriber based on the routing information of the subscriber data associated with the first subscriber identity number. Correspondingly, the UDM network element receives the route query request message from the SMS-GMSC network element. The route query request message includes the first subscriber identity number and is used to request a roaming number of the called subscriber or routing addressing information of a network in which the called subscriber is currently located.

It should be noted that the route query request message in this embodiment is an example description of the fifth message in the foregoing embodiment. The fifth message may alternatively be in another form. This is not limited in this embodiment.

S906: The UDM network element queries a database of the UDM network element based on the first subscriber identity number to obtain the roaming number of the called subscriber or the routing addressing information of the network in which the called subscriber is currently located, and further sends, to the SMS-GMSC network element, the roaming number of the called subscriber or the routing addressing information of the network in which the called subscriber is currently located. Correspondingly, the SMS-GMSC network element receives, from the UDM network element, the roaming number of the called subscriber or the routing addressing information of the network in which the called subscriber is currently located.

Optionally, if the routing information of the subscriber data associated with the first subscriber identity number in this embodiment includes the routing addressing information of the UDM network element storing the subscriber data associated with the first subscriber identity number and index information of the subscriber data associated with the first subscriber identity number, the UDM network element may quickly find, with reference to the index information of the subscriber data associated with the first subscriber identity number, the roaming number of the called subscriber or the routing addressing information of the network in which the called subscriber is currently located when querying the database of the UDM network element based on the first subscriber identity number.

S907: The SMS-GMSC network element continues an SMS message procedure based on the roaming number of the called subscriber or the routing addressing information of the network in which the called subscriber is currently located. For example, the SMS message request message is sent, based on the roaming number or the routing addressing information, to a next-hop node for processing. This is not limited herein.

It should be noted that in this embodiment, to support roaming interworking of conventional telecommunication networks, before querying, from the BCHF network element, the routing information of the subscriber data associated with the first subscriber identity number of the called subscriber, the SMS-GMSC network element may alternatively use a manner in an existing technology to address, by using a signaling network route, the subscriber data associated with the first subscriber identity number; or address, by using a dedicated mobile number portability database, the subscriber data associated with the first subscriber identity number. If the SMS-GMSC network element determines that the subscriber data associated with the first subscriber identity number fails to be addressed by using the signaling network route or the subscriber data associated with the first subscriber identity number fails to be addressed by using the dedicated mobile number portability database, the SMS-GMSC network element queries, from the BCHF network element, the routing information of the subscriber data associated with the first subscriber identity number of the called subscriber. The SMS-GMSC network element may alternatively query, from the BCHF network element, the routing information of the subscriber data associated with the first subscriber identity number of the called subscriber; and if the query fails, use the manner in the existing technology to address, by using the signaling network route, the subscriber data associated with the first subscriber identity number; or address, by using the dedicated mobile number portability database, the subscriber data associated with the first subscriber identity number. This is not limited in this embodiment.

The embodiment shown in FIG. 9 provides the subscriber identity management method by using the SMS message addressing procedure as an example. Based on the subscriber identity management method provided in this embodiment, after obtaining the first subscriber identity number, the SMS-GMSC network element may obtain the routing information of the subscriber data associated with the first subscriber identity number by querying the consortium blockchain system by using the BCHF network element. In other words, in this embodiment, routing information of subscriber data associated with a subscriber identity number may be recorded by using the consortium blockchain system. This manner replaces a manner in which a conventional telecommunication network relies on an independent signaling network to provide a signaling route. In consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The actions of the BCHF network element, the UDM network element, or the SMS-GMSC network element in step S901 to step S907 may be performed by the processor

601 in the communication device 600 shown in FIG. 6 by invoking the application program code stored in the memory 603. This is not limited in this embodiment.

It should be noted that the registration procedure shown in FIG. 7, the voice call procedure shown in FIG. 8, and the SMS message procedure shown in FIG. 9 are all described by using an example in which the communication system shown in FIG. 2 is applied to the 5G network architecture shown in FIG. 3. If a description is given by using an example in which the communication system shown in FIG. 2 is applied to the 4G network architecture shown in FIG. 4, by using an example in which the communication system shown in FIG. 2 is applied to the 2G network or 3G network architecture shown in FIG. 5, or by using an example in which the communication system shown in FIG. 2 is applied to a future mobile network, a corresponding subscriber identity management method is similar to the methods in the foregoing embodiments, and only names of related network elements or messages exchanged between network elements need to be adaptively replaced. Details are not described herein.

It should be noted that the registration procedure shown in FIG. 7, the voice call procedure shown in FIG. 8, or the SMS message procedure shown in FIG. 9 is merely an example description. If it is necessary to interact with the consortium blockchain system for another service, another network element also interacts with the BCHF network element for processing. The interaction processing procedures described in the foregoing embodiments are also applicable. This is described herein and is not described in the following again.

It should be noted that the registration procedure shown in FIG. 7, the voice call procedure shown in FIG. 8, and the SMS message procedure shown in FIG. 9 are all described by using an example in which the consortium blockchain system has stored the routing information of the subscriber data associated with the subscriber identity number. The following provides related implementation of configuring, in the consortium blockchain system, the routing information of the subscriber data associated with the subscriber identity number.

Figure 10:
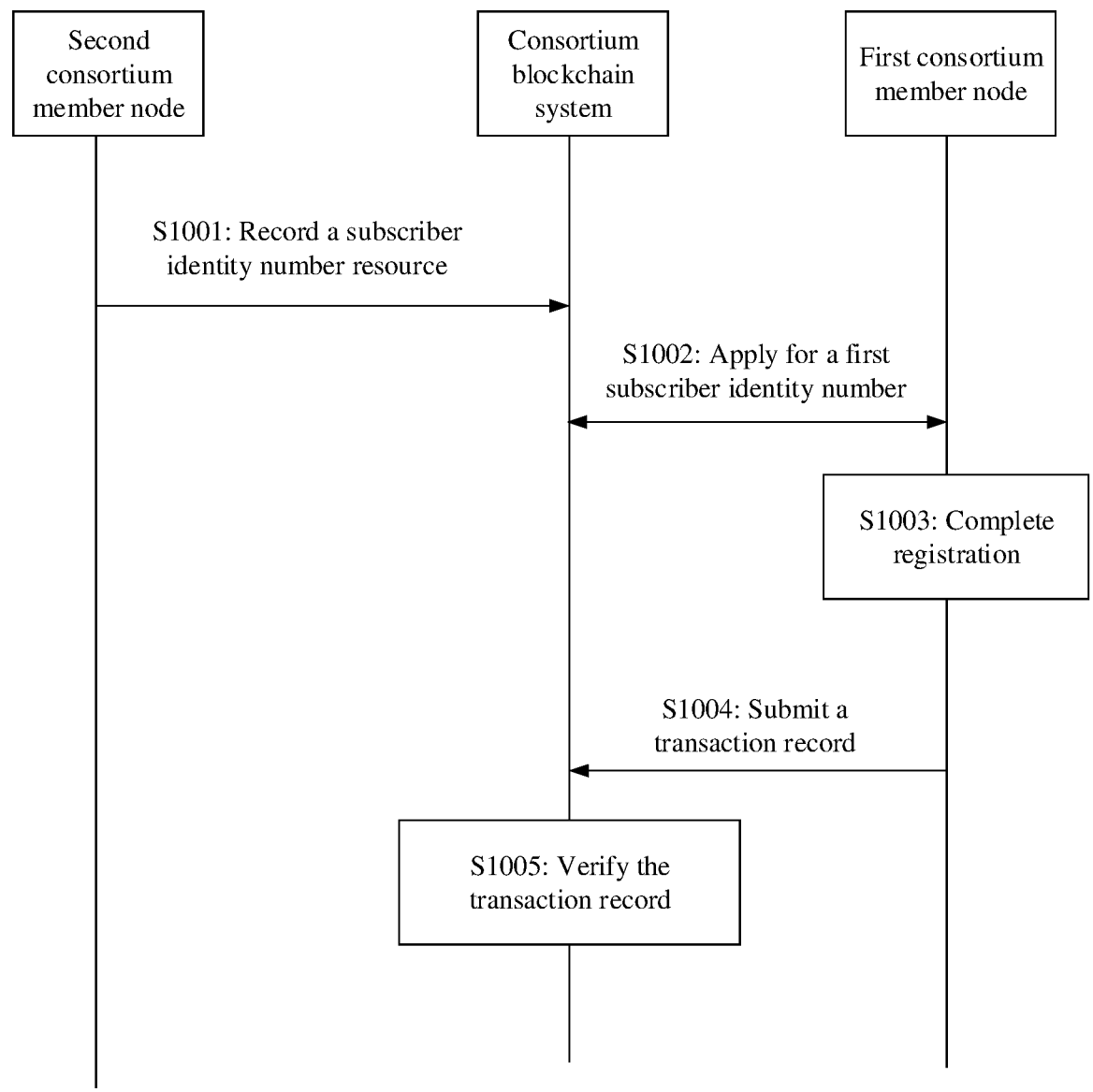
FIG. 10 is a fourth schematic flowchart of a subscriber identity management method according to an embodiment.

Based on the consortium blockchain system shown in FIG. 1, FIG. 10 shows a subscriber identity management method according to an embodiment. The subscriber identity management method may be used when consortium member nodes sharing subscriber identity numbers based on the consortium blockchain system apply for subscriber identity numbers, and includes the following steps:

S1001: A second consortium member node obtains a subscriber identity number resource and records the subscriber identity number resource into the consortium blockchain system in a broadcast manner.

Optionally, the second consortium member node in this embodiment may be a consortium member node corresponding to a subscriber identity purchaser entrusted by a consortium in the consortium blockchain system, or the second consortium member node in this embodiment may be any consortium member node that owns a subscriber identity number resource in the consortium blockchain system. This is not limited in this embodiment.

Optionally, the subscriber identity number resource in this embodiment may be an IMSI resource or an MSISDN resource. The subscriber identity number resource may be a number segment, a start range, or the like of a subscriber identity number; and may be a continuous subscriber identity number resource or a non-continuous subscriber identity number resource. This is not limited in this embodiment.

Optionally, in this embodiment, after obtaining the subscriber identity number resource, the consortium blockchain system may first verify legality of an identity of the second consortium member node, for example, whether the second consortium member node is a consortium member node corresponding to the subscriber identity purchaser entrusted by the consortium or whether the second consortium member node is a consortium member node in the consortium blockchain system; and after verifying that the identity of the second consortium member node is legal, store the subscriber identity number resource into the consortium blockchain system, thereby ensuring security and reliability of information. In addition, after obtaining the subscriber identity number resource, the consortium blockchain system may further create a pricing contract according to a predetermined pricing policy. The pricing contract is used to charge and settle fees for occupation of a subscriber identity number, that is, the consortium member node applies, on demand, to use the subscriber identity number shared in the consortium blockchain system, but also needs to pay for the occupation of the subscriber identity number.

S1002: A first consortium member node submits, based on a service requirement, an application to the consortium blockchain system to obtain a first subscriber identity number. The submitted application includes a quantity M of required subscriber identity numbers. Optionally, the submitted application may further include a special requirement on the subscriber identity number, for example, a start range of the number and a number segment feature. Further, the consortium blockchain system may assign the first subscriber identity number to the first consortium member node based on an idle assignable subscriber identity number resource. The first subscriber identity number includes N numbers in a subscriber identity number resource stored in the consortium blockchain system, and N is a positive integer less than or equal to M. In other words, the consortium blockchain system may assign, to the first consortium member node, subscriber identity numbers whose quantity is equal to the applied quantity; or may assign, to the first consortium member node, subscriber identity numbers whose quantity is less than the applied quantity. This is not limited in this embodiment.

Optionally, in this embodiment, that the first consortium member node submits an application to the consortium blockchain system to obtain a first subscriber identity number may be: The first consortium member node queries consortium blockchain data stored on the first consortium member node to obtain the first subscriber identity number; or the first consortium member node submits the application to another consortium member node in the consortium blockchain system, so that the another consortium member node queries, based on information about the submitted application, consortium blockchain data stored on the another consortium member node to obtain the first subscriber identity number. This is not limited in this embodiment of this application.

Optionally, in this embodiment, the first consortium member node and the second consortium member node may be a same consortium member node or may be different consortium member nodes. This is not limited in this embodiment.

S1003: The first consortium member node performs subscription and registration for the first subscriber identity number after obtaining the first subscriber identity number, for example, assigns a database storage space and even generates basic subscription data such as a security key, a subscriber level, and a basic plan.

S1004: The first consortium member node submits, to the consortium blockchain system, the foregoing transaction record of purchasing the first subscriber identity number. In other words, the first consortium member node broadcasts, to another consortium member node in the consortium blockchain system, the foregoing transaction record of purchasing the first subscriber identity number.

The transaction record includes the first subscriber identity number and routing information of subscriber data associated with the first subscriber identity number. For a related description of the routing information of the subscriber data associated with the first subscriber identity number, refer to the embodiment shown in FIG. 7. Details are not described herein again.

Optionally, the transaction record may further include one or more of the following: an address of a smart contract created by the first consortium member node or a signature of the first consortium member node. When a terminal device served by the first consortium member node uses a service in a roaming network, the smart contract is used to be invoked by the roaming network to perform charging statistics collection and settlement for the service used by the terminal device in the roaming network. The signature of the first consortium member node is used by the consortium blockchain system to verify that an identity of a submitter of the transaction record is the first consortium member node.

S1005: The consortium blockchain system stores the transaction record into the consortium blockchain system after verifying that a transaction is legal.

Optionally, in this embodiment, the verification performed by the consortium blockchain system on the legality of the transaction may also be understood as verification performed by a consortium member node other than the first consortium member node in the consortium blockchain system on the legality of the transaction. This is described herein and is not described in the following again.

Optionally, in this embodiment, a method for verifying the legality of the transaction by the consortium blockchain system may include: verifying that a state of the first subscriber identity number related to the transaction record is idle and available before the transaction; verifying, based on the signature included in the transaction record, a transaction party and the submitter of the transaction record are the same and are a legal consortium member node; verifying that fees related to the transaction are correctly settled; and/or so on.

In addition, in this embodiment, according to the foregoing pricing contract, after obtaining the transaction record, a consortium member node may further complete settlement of fees for purchasing a number resource. This is not limited in this embodiment.

The embodiment shown in FIG. 10 provides the subscriber identity management method by using the application procedure of the first subscriber identity number as an example. Based on the subscriber identity management method provided in this embodiment, in consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The actions of the first consortium member node or the second consortium member node in steps S1001 to S1005 may be performed by the processor 601 in the communication device 600 shown in FIG. 6 by invoking the application code stored in the memory 603. This is not limited in this embodiment.

Figure 11:
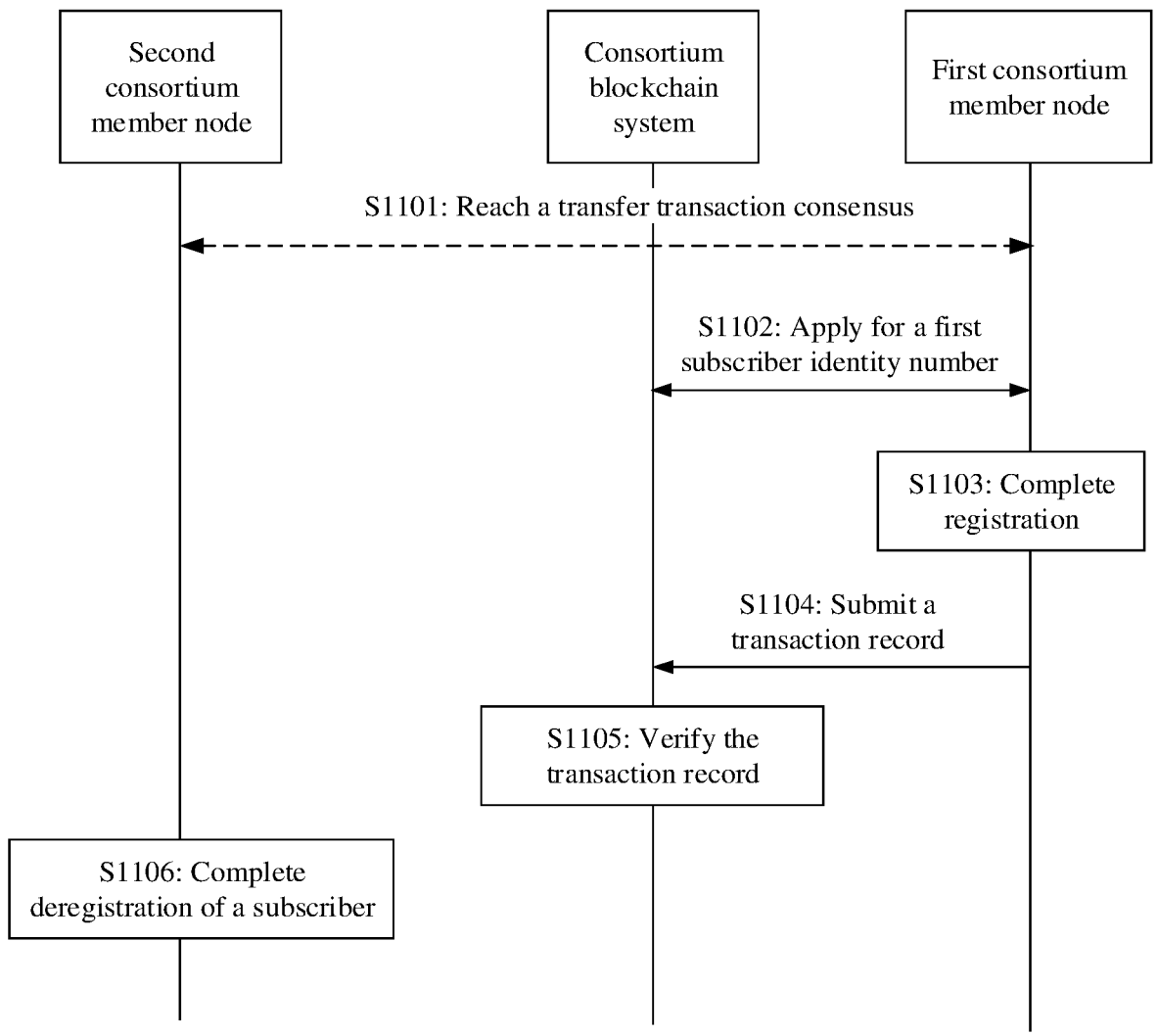
FIG. 11 is a fifth schematic flowchart of a subscriber identity management method according to an embodiment.

Optionally, based on the consortium blockchain system shown in FIG. 1, FIG. 11 shows a subscriber identity management method according to an embodiment. The subscriber identity management method may be used when consortium member nodes sharing subscriber identity numbers based on the consortium blockchain system transfer subscriber identity numbers to each other, and includes the following steps:

S1101: A first consortium member node and a second consortium member node mutually reach a transaction consensus on transferring a first subscriber identity number, including a number list and a fee (the fee is optional) of a transaction. In addition, a transfer or member (which is assumed as the second consortium member node herein) generates a signature based on a private key of the transferor member and provides the signature for a transferee member (which is assumed as the first consortium member node herein).

It should be noted that step S1101 in this embodiment is an optional step. An enterprise corresponding to the first consortium member node and an enterprise corresponding to the second consortium member node may alternatively reach a transaction consensus offline, and then input a number list and a fee (the fee is optional) of a transaction into the first consortium member node. This is not limited in this embodiment.

S1102: The first consortium member node verifies, to the consortium blockchain system after obtaining the first subscriber identity number, that the second consortium member node is a current owner of the first subscriber identity number.

For example, the first consortium member node may submit an application to the consortium blockchain system, where the submitted application includes the signature of the second consortium member node and the first subscriber identity number to be transferred by the second consortium member node to the first consortium member node. Further, the consortium blockchain system may check that the signature of the second consortium member node belongs to the current owner of the first subscriber identity related to the transaction.

Optionally, in this embodiment, that the first consortium member node verifies, to the consortium blockchain system, that the second consortium member node is a current owner of the first subscriber identity number may be: The first consortium member node queries consortium blockchain data stored on the first consortium member node to verify that the second consortium member node is the current owner of the first subscriber identity number; or the first consortium member node submits an application to another consortium member node in the consortium blockchain system, so that the another consortium member node queries, based on information about the submitted application, consortium blockchain data stored on the another consortium member node to verify that the second consortium member node is the current owner of the first subscriber identity number. This is not limited in this embodiment.

S1103: The first consortium member node may perform subscription and registration for the first subscriber identity number after verifying that the second consortium member node is the current owner of the first subscriber identity number, for example, assign a database storage space and even generate basic subscription data such as a security key, a subscriber level, and a basic plan.

S1104: The first consortium member node submits, to the consortium blockchain system, the foregoing transaction record of transferring the first subscriber identity number. In other words, the first consortium member node broadcasts, to another consortium member node in the consortium blockchain system, the foregoing transaction record of transferring the first subscriber identity number.

The transaction record includes the first subscriber identity number and routing information of subscriber data associated with the first subscriber identity number. For a related description of the routing information of the subscriber data associated with the first subscriber identity number, refer to the embodiment shown in FIG. 7. Details are not described herein again.

Optionally, the transaction record may further include one or more of the following: an address of a smart contract created by the first consortium member node, a signature of the first consortium member node, or the signature of the second consortium member node. When a terminal device served by the first consortium member node uses a service in a roaming network, the smart contract is used to be invoked by the roaming network to perform charging statistics collection and settlement for the service used by the terminal device in the roaming network. The signature of the first consortium member node is used to verify that participants of the transaction record include the first consortium member node; and the signature of the second consortium member node is used to verify that the participants of the transaction record include the second consortium member node.

S1105: The consortium blockchain system stores the transaction record into the consortium blockchain system after verifying that a transaction is legal.

Optionally, in this embodiment, the verification performed by the consortium blockchain system on the legality of the transaction may also be understood as verification performed by a consortium member node other than the first consortium member node in the consortium blockchain system on the legality of the transaction. This is described herein and is not described in the following again.

Optionally, in this embodiment, a method for verifying the legality of the transaction by the consortium blockchain system may include: verifying that a state of the first subscriber identity number related to the transaction record is that the first subscriber identity number is owned by a transferor before the transaction; verifying identities of two parties of the transaction based on the signatures included in the transaction record; verifying that fee settlement about the transaction is correct, and/or so on.

In addition, in this embodiment, according to the foregoing transaction consensus, the first consortium member node and the second consortium member node may complete settlement of fees for transferring a number resource. This is not limited in this embodiment.

S1106: The second consortium member node completes deregistration on subscriber data corresponding to the transferred first subscriber identity number after learning, by synchronizing updated consortium blockchain data, that the transaction is successfully completed, for example, clears subscriber data stored in a corresponding data management network element to release an occupied storage space.

The embodiment shown in FIG. 11 provides the subscriber identity management method by using the transfer procedure of the first subscriber identity number as an example. Based on the subscriber identity management method provided in this embodiment, in consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The actions of the first consortium member node or the second consortium member node in steps S1101 to S1106 may be performed by the processor 601 in the communication device 600 shown in FIG. 6 by invoking the application code stored in the memory 603. This is not limited in this embodiment.

Figure 12:
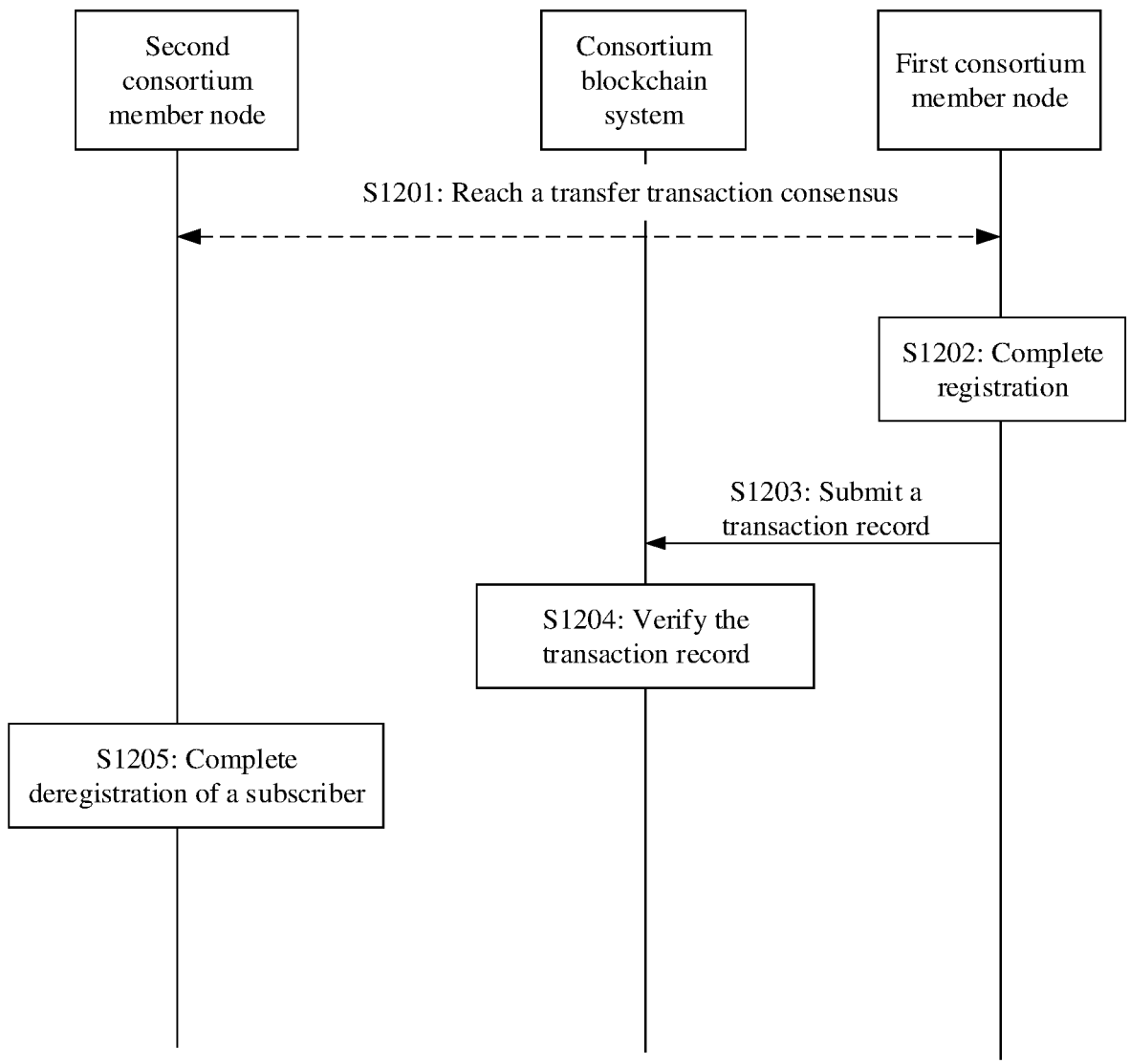
FIG. 12 is a sixth schematic flowchart of a subscriber identity management method according to an embodiment.

Optionally, based on the consortium blockchain system shown in FIG. 1, FIG. 12 shows a subscriber identity management method according to an embodiment. The subscriber identity management method may be used when a mobile number of a subscriber is switched between networks of operators. Transfer of a subscriber identity number is transacted and recorded between the operators by using the consortium blockchain system. The method includes the following steps:

S1201: A first consortium member node and a second consortium member node mutually reach a transaction consensus on transferring a first subscriber identity number, including a number list and a fee (the fee is optional) of a transaction. In addition, a transferor member (which is assumed as the second consortium member node herein) generates a signature based on a private key of the transferor member and provides the signature for a transferee member (which is assumed as the first consortium member node herein).

It should be noted that step S1201 in this embodiment is an optional step. An enterprise corresponding to the first consortium member node and an enterprise corresponding to the second consortium member node may alternatively reach a transaction consensus offline, and then store a number list and a fee (the fee is optional) of a transaction into the first consortium member node. This is not limited in this embodiment.

S1202: The first consortium member node performs subscription and registration for the first subscriber identity number, for example, assigns a database storage space and even generates basic subscription data such as a security key, a subscriber level, and a basic plan.

S1203: The first consortium member node submits, to the consortium blockchain system, the foregoing transaction record of transferring the first subscriber identity number. In other words, the first consortium member node broadcasts, to another consortium member node in the consortium blockchain system, the foregoing transaction record of transferring the first subscriber identity number.

For related descriptions of step S1203, refer to step S1104 in the embodiment shown in FIG. 11. Details are not described herein again.

S1204: The consortium blockchain system stores the transaction record into the consortium blockchain system after verifying that a transaction is legal.

For related descriptions of step S1204, refer to step S1105 in the embodiment shown in FIG. 11. Details are not described herein again.

In addition, in this embodiment, if a fee needs to be paid for the transfer, according to a transfer agreement of the two parties, the first consortium member node and the second consortium member node may perform fee settlement. This is not limited in this embodiment.

S1205: The second consortium member node completes deregistration on subscriber data corresponding to the transferred first subscriber identity number after learning, by synchronizing updated consortium blockchain data, that the transaction is successfully completed, for example, clears subscriber data stored in a corresponding data management network element to release an occupied storage space.

The embodiment shown in FIG. 12 provides the subscriber identity management method by using the mobile number portability procedure of the first subscriber identity number as an example. Based on the subscriber identity management method provided in this embodiment, in consideration that in the consortium blockchain system provided in this embodiment, a subscriber identity number resource may be shared by consortium members, and decentralized management makes consortium members equal to each other. This is very beneficial to cooperative consortiums between enterprises in one industry. This solution is especially suitable for construction and operation of dedicated communication networks in vertical industries in the future. Consortium members do not need to purchase and obtain subscriber identity number resources separately. A centralized procurement and management scale is expanded through consortium cooperation, and costs can be effectively reduced. An on-demand use method makes use of the subscriber identity number resources more efficient and maximizes social and economic benefits. Furthermore, in consideration that in this embodiment, the routing information of the subscriber data associated with the subscriber identity number recorded by the consortium blockchain system is used, not only construction and operation costs of a conventional signaling network can be reduced, but also storage or update can be automatically performed with transactions of subscriber identity numbers. This is unlike a conventional signaling network in which a signaling route of the signaling network needs to be statically configured manually offline, which relates to a large quantity of network element devices and requires a complex configuration and very high operation and maintenance costs. In addition, a statically configured signaling route needs to be configured based on a number segment and is not flexible enough. Costs of supporting sharing of a subscriber identity number and mobile number portability are very high. For example, an independent mobile number portability database is required. In conclusion, in this embodiment, a construction and operation mode that is most likely to be used in a crowdfunding or sharing manner for a dedicated communication network of a vertical industry in the future and that cannot be supported by an existing telecommunication network can be supported, and procurement costs of a subscriber identity number resource can be significantly reduced. In addition, in terms of supporting a signaling route based on a subscriber identity, compared with a conventional method, this embodiment greatly reduces signaling network construction costs and operation and maintenance costs and supports flexible sharing of subscriber identity numbers between members, or supports more efficient and economical mobile number portability of a subscriber.

The actions of the first consortium member node or the second consortium member node in steps S1201 to S1205 may be performed by the processor 601 in the communication device 600 shown in FIG. 6 by invoking the application code stored in the memory 603. This is not limited in this embodiment.

It may be understood that in the foregoing embodiments, the methods and/or steps implemented by the network device (such as a mobility management network element or a call session control network element) may alternatively be implemented by a component (such as a chip or a circuit) that may be used for the network device; the methods and/or steps implemented by the blockchain handling function network element may alternatively be implemented by a component (for example, a chip or a circuit) that may be used for the blockchain handling function network element; or the methods and/or steps implemented by the first consortium member node may alternatively be implemented by a component (for example, a chip or a circuit) that may be used for the first consortium member node.

The solutions provided in the embodiments are mainly described from a perspective of interaction between network elements. Correspondingly, the embodiments further provide a communication apparatus. The communication apparatus is configured to implement the foregoing methods. The communication apparatus may be the network device (for example, a mobility management network element or a call session control network element) in the foregoing method embodiments or a chip system that implements functions of the network device. Alternatively, the communication apparatus may be the blockchain handling function network element in the foregoing method embodiments or a chip system that implements the blockchain handling function network element. Alternatively, the communication apparatus may be the first consortium member node in the foregoing method embodiments or a chip system that implements the first consortium member node. It may be understood that, to implement the foregoing functions, the communication apparatus includes corresponding hardware structures and/or software modules for performing the functions. A person skilled in the art should be easily aware that units and algorithm steps in the examples described with reference to the embodiments can be implemented in a form of hardware or a combination of hardware and computer software. Whether a function is performed by hardware or hardware driven by computer software depends on particular applications and design constraints of the solutions. A person skilled in the art may use a different method to implement the described functions for each particular application, but it should not be considered that the implementation goes beyond the scope.

Figure 13:
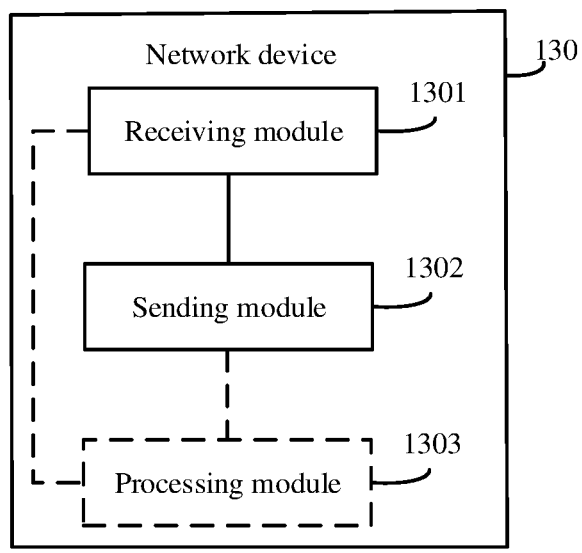
FIG. 13 is a schematic diagram of a structure of a network device according to an embodiment.

For example, the communication apparatus is the network device in the foregoing method embodiments. FIG. 13 is a schematic diagram of a structure of a network device 130. The network device 130 includes a receiving module 1301 and a sending module 1302. The receiving module 1301 may also be referred to as a receiving unit, configured to implement a receiving function, for example, may be a receiving circuit, a receiving machine, a receiver, or a communication interface. The sending module 1302 may also be referred to as a sending unit, configured to implement a sending function, for example, may be a sending circuit, a sending machine, a transmitter, or a communication interface. Functions of the receiving module 1301 and the sending module 1302 in this embodiment may alternatively be integrated. For example, the receiving module 1301 and the sending module 1302 are integrated into a transceiver module. The transceiver module may also be referred to as a transceiver unit, configured to implement a sending and/or receiving function, for example, may be a transceiver circuit, a transceiver machine, a transceiver, or a communication interface. This is not limited in this embodiment.

The receiving module 1301 is configured to receive a first message from a terminal device, where the first message includes a first subscriber identity number of the terminal device. The sending module 1302 is configured to send a second message to a blockchain handling function network element, where the second message includes the first subscriber identity number of the terminal device and is used to query routing information of subscriber data associated with the first subscriber identity number. The receiving module 1301 is further configured to receive from the blockchain handling function network element, the routing information of the subscriber data associated with the first subscriber identity number, where the routing information is used to address the subscriber data associated with the first subscriber identity number.

In a possible implementation, the network device 130 in this embodiment is a mobility management network element. The sending module 1302 is further configured to send a third message to a first data management network element based on the routing information of the subscriber data associated with the first subscriber identity number, where the third message includes the first subscriber identity number and is used to request subscription data of the terminal device, and the first data management network element is located in a home network of the terminal device. The receiving module 1301 is further configured to receive, from the first data management network element, the subscription data of the terminal device or a cause value of a failure of obtaining the subscription data.

Optionally, the sending module 1302 is further configured to send a fourth message to a second data management network element before sending the second message to the blockchain handling function network element, where the fourth message includes the first subscriber identity number of the terminal device and is used to request the subscription data of the terminal device, and the second data management network element is located in a network in which the network device is located. The receiving module 1301 is further configured to receive, from the second data management network element, an indication of a failure of obtaining the subscription data.

In another possible implementation, the network device 130 in this embodiment is a call session control network element. As shown in FIG. 13, the network device 130 may further include a processing module 1303. The sending module 1302 is further configured to send a fifth message to a first data management network element based on the routing information of the subscriber data associated with the first subscriber identity number, where the fifth message includes the first subscriber identity number and is used to request a roaming number of a called subscriber or routing addressing information of a network in which the called subscriber is currently located, and the first data management network element is located in a home network of the terminal device. The receiving module 1301 is further configured to receive, from the first data management network element, the roaming number of the called subscriber or the routing addressing information of the network in which the called subscriber is currently located. The processing module 1303 is configured to continue a voice call procedure or an SMS message procedure based on the roaming number of the called subscriber or the routing addressing information of the network in which the called subscriber is currently located.

Optionally, the processing module 1303 is further configured to determine that the subscriber data associated with the first subscriber identity number fails to be addressed by using a signaling network route; or the processing module 1303 is further configured to determine that the subscriber data associated with the first subscriber identity number fails to be addressed by using a dedicated mobile number portability database.

All related content of the steps in the foregoing method embodiments may be cited in function descriptions of corresponding function modules. Details are not described herein again.

In this embodiment, the network device 130 is presented in a form of function modules obtained through division in an integrated manner. The "module" herein may be an ASIC, a circuit, a processor and a memory that execute one or more software or firmware programs, an integrated logic circuit, and/or another device that can provide the foregoing functions. In a simple embodiment, a person skilled in the art may figure out that the network device 130 may be in a form of the network device 600 shown in FIG. 6.

For example, the processor 601 in the communication device 600 shown in FIG. 6 may invoke computer-executable instructions stored in the memory 603, so that the communication device 600 performs the subscriber identity management method in the foregoing method embodiment.

For example, functions/implementation processes of the receiving module 1301, the sending module 1302, and the processing module 1303 in FIG. 13 may be implemented by the processor 601 in the communication device 600 shown in FIG. 6 by invoking the computer-executable instructions stored in the memory 603. Alternatively, a function/implementation process of the processing module 1303 in FIG. 13 may be implemented by the processor 601 in the communication device 600 shown in FIG. 6 by invoking the computer-executable instructions stored in the memory 602, and functions/implementation processes of the receiving module 1301 and the sending module 1302 in FIG. 13 may be implemented by the communication interface 604 in the communication device 600 shown in FIG. 6.

Because the network device 130 provided in this embodiment can perform the foregoing subscriber identity management method, for effects that can be achieved by the network device 130, refer to the foregoing method embodiment. Details are not described herein again.

Figure 14:
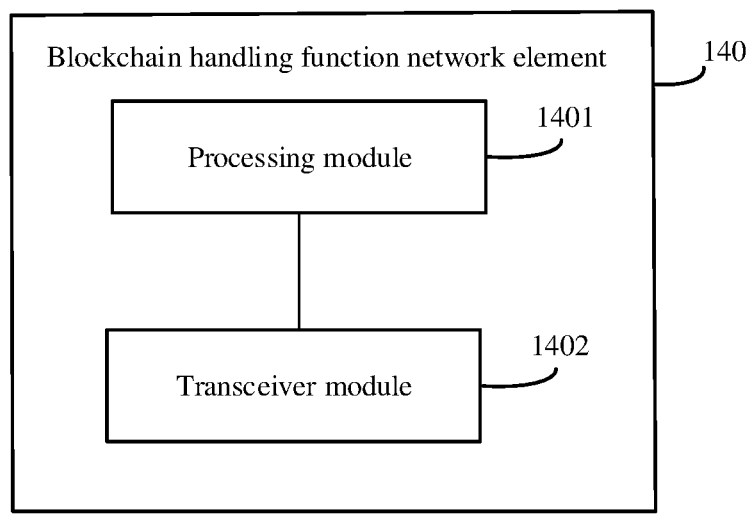
FIG. 14 is a schematic diagram of a structure of a blockchain handling function network element according to an embodiment.

For example, the communication apparatus is the blockchain handling function network element in the foregoing method embodiment. FIG. 14 is a schematic diagram of a structure of a blockchain handling function network element 140. The blockchain handling function network element 140 includes a processing module 1401 and a transceiver module 1402. The transceiver module may also be referred to as a transceiver unit, configured to implement a sending and/or receiving function, for example, may be a transceiver circuit, a transceiver machine, a transceiver, or a communication interface. This is not limited in this embodiment.

The transceiver module 1402 is configured to receive a second message from a network device, where the second message carries a first subscriber identity number of a terminal device and is used to query routing information of subscriber data associated with the first subscriber identity number. The processing module 1401 is configured to query a consortium blockchain system based on the first subscriber identity number to obtain the routing information of the subscriber data associated with the first subscriber identity number. The transceiver module 1402 is further configured to send, to the network device, the routing information of the subscriber data associated with the first subscriber identity number, where the routing information is used to address the subscriber data associated with the first subscriber identity number.

Optionally, the network device in this embodiment is a mobility management network element. The second message further includes a token for authorizing the mobility management network element to access the subscriber data associated with the first subscriber identity number. The processing module 1401 is configured to query the consortium blockchain system based on the first subscriber identity number after verifying, based on the token, that accessing the subscriber data of the terminal device by the mobility management network element is legal.

All related content of the steps in the foregoing method embodiments may be cited in function descriptions of corresponding function modules. Details are not described herein again.

In this embodiment, the blockchain handling function network element 140 is presented in a form of function modules obtained through division in an integrated manner. The "module" herein may be an ASIC, a circuit, a processor, and a memory that execute one or more software or firmware programs, an integrated logic circuit, and/or another device that can provide the foregoing functions. In a simple embodiment, a person skilled in the art may figure out that the blockchain handling function network element 140 may use the form of the communication device 600 shown in FIG. 6.

For example, the processor 601 in the communication device 600 shown in FIG. 6 may invoke computer-executable instructions stored in the memory 603, so that the communication device 600 performs the subscriber identity management method in the foregoing method embodiment.

For example, functions/implementation processes of the transceiver module 1402 and the processing module 1401 in FIG. 14 may be implemented by the processor 601 in the communication device 600 shown in FIG. 6 by invoking the computer-executable instructions stored in the memory 603. Alternatively, a function/implementation process of the processing module 1401 in FIG. 14 may be implemented by the processor 601 in the communication device 600 shown in FIG. 6 by invoking the computer-executable instructions stored in the memory 602. A function/implementation process of the transceiver module 1402 in FIG. 14 may be implemented by the communication interface 604 in the communication device 600 shown in FIG. 6.

Because the blockchain handling function network element 140 provided in this embodiment can perform the foregoing subscriber identity management method, for effects that can be achieved by the blockchain handling function network element 140, refer to the foregoing method embodiment. Details are not described herein again.

Figure 15:
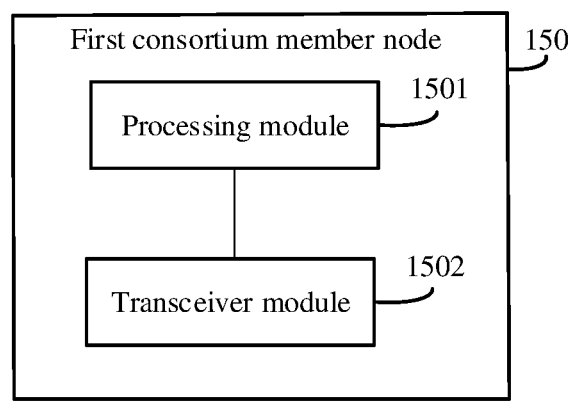
FIG. 15 is a schematic diagram of a structure of a first consortium member node according to an embodiment.

For example, the communication apparatus is the first consortium member node in the foregoing method embodiment. FIG. 15 is a schematic diagram of a structure of a first consortium member node 150. The first consortium member node 150 includes a processing module 1501 and a transceiver module 1502. The transceiver module may also be referred to as a transceiver unit, configured to implement a sending and/or receiving function, for example, may be a transceiver circuit, a transceiver machine, a transceiver, or a communication interface. This is not limited in this embodiment.

The first consortium member node is any one of a plurality of consortium member nodes in a consortium blockchain system.

In a possible implementation, the processing module 1501 is configured to determine a quantity M of required subscriber identity numbers, where the first consortium member node is any one of the plurality of consortium member nodes; the processing module 1501 is further configured to obtain a first subscriber identity number from the consortium blockchain system based on the quantity M of required subscriber identity numbers, where the first subscriber identity number includes N numbers in a subscriber identity number resource stored in the consortium blockchain system, and N is a positive integer less than or equal to M; the processing module 1501 is further configured to perform subscription and registration for the first subscriber identity number; and the transceiver module 1502 is configured to broadcast a transaction record to another consortium member node in the consortium blockchain system, so that the consortium blockchain system stores the transaction record after the another consortium member node verifies that a transaction is legal, where the transaction record includes the first subscriber identity number and routing information of subscriber data associated with the first subscriber identity number.

Optionally, the processing module 1501 is further configured to update an obtained subscriber identity number resource or a subscriber identity number resource owned by the first consortium member node to the subscriber identity number resource stored in the consortium blockchain system.

Alternatively, in another possible implementation, the processing module 1501 is configured to obtain a first subscriber identity number, where the first subscriber identity number is one or more numbers that a second consortium member node prepares to transfer to the first consortium member node, the first consortium member node is any one of the plurality of consortium member nodes, and the second consortium member node is one of the plurality of consortium member nodes that is different from the first consortium member node; and the transceiver module 1502 is configured to broadcast a transaction record to another consortium member node in the consortium blockchain system, so that the consortium blockchain system stores the transaction record after the another consortium member node verifies that a transaction is legal, where the transaction record includes the first subscriber identity number and routing information of subscriber data associated with the first subscriber identity number.

Optionally, the processing module 1501 is further configured to verify, to the consortium blockchain system, that the second consortium member node is a current owner of the first subscriber identity number; and the processing module 1501 is further configured to perform subscription and registration for the first subscriber identity number.

All related content of the steps in the foregoing method embodiments may be cited in function descriptions of corresponding function modules. Details are not described herein again.

In this embodiment, the first consortium member node 150 is presented in a form of obtaining each function module through division in an integrated manner. The "module" herein may be an ASIC, a circuit, a processor, and a memory that execute one or more software or firmware programs, an integrated logic circuit, and/or another device that can provide the foregoing functions. In a simple embodiment, a person skilled in the art may be aware that the first consortium member node 150 may use the form of the communication device 600 shown in FIG. 6.

For example, the processor 601 in the communication device 600 shown in FIG. 6 may invoke computer-executable instructions stored in the memory 603, so that the communication device 600 performs the subscriber identity management method in the foregoing method embodiment.

For example, functions/implementation processes of the transceiver module 1502 and the processing module 1501 in FIG. 15 may be implemented by the processor 601 in the communication device 600 shown in FIG. 6 by invoking the computer-executable instructions stored in the memory 603. Alternatively, a function/implementation process of the processing module 1501 in FIG. 15 may be implemented by the processor 601 in the communication device 600 shown in FIG. 6 by invoking the computer execution instructions stored in the memory 602, and a function/an implementation process of the transceiver module 1502 in FIG. 15 may be implemented by the communication interface 604 in the communication device 600 shown in FIG. 6.

Because the first consortium member node 150 provided in this embodiment can perform the foregoing subscriber identity management method, for effects that can be achieved by the first consortium member node 150, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of computer program instructions and is stored in a memory. The processor may be configured to execute the program instructions to implement the foregoing method procedures. The processor may be built into a system on chip (SoC) an ASIC, or may be an independent semiconductor chip. In addition to a core configured to perform an operation or processing by executing software instructions, the processor may further include a necessary hardware accelerator, for example, a field programmable gate array (FPGA), a programmable logic device (PLD), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete device. The hardware may run necessary software or does not depend on software, to perform the foregoing method procedures.

Optionally, the embodiments further provide a communication apparatus (for example, the communication apparatus may be a chip or a chip system). The communication apparatus includes a processor, configured to implement the method in any one of the foregoing method embodiments. The communication apparatus may further include a memory. The memory is configured to store necessary program instructions and data. The processor may invoke program code stored in the memory, to indicate the communication apparatus to perform the method in any one of the foregoing method embodiments. The memory may not be in the communication apparatus. When the communication apparatus is the chip system, the communication apparatus may include a chip, or may include a chip and another discrete component. This is not limited in the embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person skilled in the art may understand and implement another variation of the disclosed embodiments by viewing the accompanying drawings and embodiments. A single processor or another unit may implement several functions enumerated in the embodiments.

Various modifications and combinations may be made without departing from the spirit and scope. Correspondingly, the embodiments and the accompanying drawings are merely example descriptions, and are considered as any or all of modifications, variations, combinations, or equivalents that cover the scope of the embodiments. A person skilled in the art can make various modifications and variations without departing from the spirit and scope. In this way, modifications and variations are covered provided that the modifications and variations fall within the scope of the embodiments and their equivalent technologies.

What is claimed is:

1. A subscriber identity management method, comprising:
   receiving, by a network device, a first message from a terminal device, wherein the first message comprises a first subscriber identity number of the terminal device;
   sending, by the network device, a second message to a blockchain handling function network element, wherein the second message comprises the first subscriber identity number of the terminal device and is used to query routing information of subscriber data associated with the first subscriber identity number; and
   receiving, by the network device from the blockchain handling function network element, the routing information of the subscriber data associated with the first subscriber identity number, wherein the routing information is used to address the subscriber data associated with the first subscriber identity number.

2. The subscriber identity management method according to claim 1, wherein the network device is a mobility management network element, and the method further comprises:
   sending, by the network device, a third message to a first data management network element based on the routing information of the subscriber data associated with the first subscriber identity number, wherein the third message comprises the first subscriber identity number and is used to request subscription data of the terminal device, and the first data management network element is located in a home network of the terminal device; and
   receiving, by the network device from the first data management network element, the subscription data of the terminal device or a cause value of a failure of obtaining the subscription data.

3. The subscriber identity management method according to claim 2, wherein the first message further comprises a token for authorizing the mobility management network element to access the subscriber data associated with the first subscriber identity number; and
   the third message further comprises the token, and the token is used to verify legality of accessing the subscriber data of the terminal device by the mobility management network element.

4. The subscriber identity management method according to claim 3, wherein
   the second message further comprises the token, and the token is used to verify legality of accessing the subscriber data of the terminal device by the mobility management network element.

5. The subscriber identity management method according to claim 1, wherein before the sending, by the network device, a second message to a blockchain handling function network element, the method further comprises:
   sending, by the network device, a fourth message to a second data management network element, wherein the fourth message comprises the first subscriber identity number of the terminal device and is used to request the subscription data of the terminal device, and the second data management network element is located in a network in which the network device is located; and
   receiving, by the network device from the second data management network element, an indication of a failure of obtaining the subscription data.

6. The subscriber identity management method according to claim 1, wherein the network device is a call session control network element, and the method further comprises:
   sending, by the network device, a fifth message to a first data management network element based on the routing information of the subscriber data associated with the first subscriber identity number, wherein the fifth message comprises the first subscriber identity number and is used to request a roaming number of a called subscriber or routing addressing information of a network in which the called subscriber is currently located, and the first data management network element is located in a home network of the terminal device;
   receiving, by the network device from the first data management network element, the roaming number of the called subscriber or the routing addressing information of the network in which the called subscriber is currently located; and
   continuing, by the network device, a voice call procedure or an SMS message procedure based on the roaming number of the called subscriber or the routing addressing information of the network in which the called subscriber is currently located.

7. The subscriber identity management method according to claim 6, wherein before the sending, by the network device, the second message to the blockchain handling function network element, the method further comprises:
- determining, by the network device, that the subscriber data associated with the first subscriber identity number fails to be addressed by using a signaling network route; or
- determining, by the network device, that the subscriber data associated with the first subscriber identity number fails to be addressed by using a dedicated mobile number portability database.

8. A network device, comprising:
a processor; and
a memory coupled to the processor and configured to store instructions that, when executed by the processor, cause the network device to:
receive a first message from a terminal device, wherein the first message comprises a first subscriber identity number of the terminal device;
send a second message to a blockchain handling function network element, wherein the second message comprises the first subscriber identity number of the terminal device and is used to query routing information of subscriber data associated with the first subscriber identity number; and
receive, from the blockchain handling function network element, the routing information of the subscriber data associated with the first subscriber identity number, wherein the routing information is used to address the subscriber data associated with the first subscriber identity number.

9. The network device according to claim 8, wherein the network device is a mobility management network element;
the instructions further cause the network device to send a third message to a first data management network element based on the routing information of the subscriber data associated with the first subscriber identity number, wherein the third message comprises the first subscriber identity number and is used to request subscription data of the terminal device, and the first data management network element is located in a home network of the terminal device; and
receive, from the first data management network element, the subscription data of the terminal device or a cause value of a failure of obtaining the subscription data.

10. The network device according to claim 9, wherein the first message further comprises a token for authorizing the mobility management network element to access the subscriber data associated with the first subscriber identity number; and
the third message further comprises the token, and the token is used to verify legality of accessing the subscriber data of the terminal device by the mobility management network element.

11. The network device according to claim 10, wherein the second message further comprises the token, and the token is used to verify legality of accessing the subscriber data of the terminal device by the mobility management network element.

12. The network device according to claim 8, wherein the instructions further cause the network device to send a fourth message to a second data management network element before sending the second message to the blockchain handling function network element, wherein the fourth message comprises the first subscriber identity number of the terminal device and is used to request the subscription data of the terminal device, and the second data management network element is located in a network in which the network device is located; and
receive, from the second data management network element, an indication of a failure of obtaining the subscription data.

13. The network device according to claim 8, wherein the network device is a call session control network element, and the instructions further cause the network device to send a fifth message to a first data management network element based on the routing information of the subscriber data associated with the first subscriber identity number, wherein the fifth message comprises the first subscriber identity number and is used to request a roaming number of a called subscriber or routing addressing information of a network in which the called subscriber is currently located, and the first data management network element is located in a home network of the terminal device;
receive, from the first data management network element, the roaming number of the called subscriber or the routing addressing information of the network in which the called subscriber is currently located; and
continue a voice call procedure or an SMS message procedure based on the roaming number of the called subscriber or the routing addressing information of the network in which the called subscriber is currently located.

14. The network device according to claim 11, wherein the instructions further cause the network device to determine that the subscriber data associated with the first subscriber identity number fails to be addressed by using a signaling network route; or
determine that the subscriber data associated with the first subscriber identity number fails to be addressed by using a dedicated mobile number portability database.

* * * * *